US007507785B2

(12) United States Patent
Vanmaele et al.

(10) Patent No.: US 7,507,785 B2
(45) Date of Patent: Mar. 24, 2009

(54) POLYMERIC CO-INITIATORS

(75) Inventors: Luc Vanmaele, Lochristi (BE); Johan Loccufoer, Zwijnaarde (BE); Yu Chen, Mainz (DE); Holger Frey, Emmendingen (DE)

(73) Assignee: Agfa Graphics N.V., Mortsel (BE)

( * ) Notice: Subject to any disclaimer, the term of this patent is extended or adjusted under 35 U.S.C. 154(b) by 462 days.

(21) Appl. No.: 11/169,091

(22) Filed: Jun. 28, 2005

(65) Prior Publication Data

US 2006/0014849 A1    Jan. 19, 2006

Related U.S. Application Data

(60) Provisional application No. 60/601,886, filed on Aug. 16, 2004.

(30) Foreign Application Priority Data

Jul. 15, 2004    (EP)    ................... 04103395

(51) Int. Cl.
*C08G 59/68*    (2006.01)
(52) U.S. Cl. .................. 528/408; 524/555; 525/118
(58) Field of Classification Search ................. 524/555; 525/118; 528/408
See application file for complete search history.

(56) References Cited

U.S. PATENT DOCUMENTS

| 4,857,630 | A |  | 8/1989 | Kim |
| 5,196,502 | A |  | 3/1993 | Turner et al. |
| 5,214,122 | A |  | 5/1993 | Turner et al. |
| 5,225,522 | A |  | 7/1993 | Turner et al. |
| 5,538,548 | A |  | 7/1996 | Yamazaki |
| 6,300,388 | B1 |  | 10/2001 | Verdonck et al. |
| 6,310,115 | B1 |  | 10/2001 | Vanmaele et al. |
| 6,548,605 | B1 | * | 4/2003 | Morita et al. ............ 525/330.6 |
| 6,716,948 | B1 | * | 4/2004 | Klaerner et al. .......... 526/303.1 |
| 6,822,068 | B2 | * | 11/2004 | Sunder et al. ............... 528/409 |
| 7,091,308 | B2 | * | 8/2006 | Haggman et al. ........... 528/417 |
| 2003/0092879 | A1 |  | 5/2003 | Sunder et al. |
| 2003/0120022 | A1 |  | 6/2003 | Sunder et al. |
| 2006/0014850 | A1 | * | 1/2006 | Vanmaele et al. ............. 522/25 |

FOREIGN PATENT DOCUMENTS

| DE | 19947631 A1 | 6/2000 |
| EP | 0 434 098 A2 | 6/1991 |
| EP | 0 997 507 A1 | 5/2000 |
| EP | 1 344 805 A1 | 2/2003 |
| JP | 58198429 A2 | 11/1983 |
| JP | 61043627 | 3/1986 |
| JP | 2000-086713 | 3/2000 |
| WO | WO 96/14346 A1 | 5/1996 |
| WO | WO 99/03930 A1 | 1/1999 |
| WO | WO 99/07746 A1 | 2/1999 |
| WO | WO 02/10189 A2 | 2/2002 |
| WO | WO 02/22700 A2 | 3/2002 |
| WO | WO 03/062306 A1 | 7/2003 |
| WO | WO 2004/003542 A1 | 1/2004 |

OTHER PUBLICATIONS

European Search Report 04 10 3395.
Angiolini et al.; Polymeric photoinitiators based on side-chain benzoin methyl ether and tertiary amine moieties for fast UV-curable coatings; *Polymers for Advanced Technologies*; vol. 4, No. 6; pp. 375-384 (1993).
Burchard, W.; Solution properties of branched macromolecules. *Advanced in Polymer Science*; vol. 143, No. II; pp. 113-194 (1999).
Davidson, S. et al.; Type II polymeric photoinitiators with built-in amine synergist; *Journal of Photochemistry and Photobiology, A: Chemistry*; vol. 91, No. 2; pp. 153-163 (1995).
Davidson, S.; Exploring the Science Technology and Applications of UV and EB-curing; London, IK:SITA Technology Ltd.; p. 141 (1999).
Dworak, A. et al.; Cationic polymerization of glycidol; *Macromolecular Chemistry and Physics*; vol. 196, No. 6; pp. 1963-1970 (1995).
Flory, P.J.; Molecular size distribution in three-dimensional polymers; *Journal of the American Chemistry Society*; vol. 74; pp. 2718-2723 (1952).
Frechet, J; Self-condensing vinyl polymerization: an approach to dentritic materials; *Science*; vol. 269, No. 5227; pp. 1080-1083 (1995).
Frey, H. et al.; Degree of branching in hyperbranched polymers; *Acta Polymerica*; vol. 50; pp. 67-76 (1999).
Gao, C. et al.; Hyperbranched polymers: from synthesis to application; *Process in Polymer Science*; vol. 29, No. 3, pp. 183-275 (2000).
Hanselmann, R. et al; Hyperbranched Polymers Prepared via the Core-Dilution/Slow Addition Technique: Computer Simulation of Molecular Weight Distribution and Degree of Branching; *Macromolecules*; vol. 31, No. 12; pp. 3790-3801 (1998).
Hawker et al.; Preparation of polymers with controlled molecular architecture; *J. Am. Chem. Soc.*; vol. 112; p. 7638 (1990).
Holter, D. et al.; Degree of branching in hyperbranched polymers; *Acta Polymerica*; vol. 23, No. 48; pp. 30-35 (1997).
Holter, E.J. et al.; Degree of branching in hyperbranched polymers; *Acta Polymerica*; vol. 48, No. 8, pp. 298-309 (1997).
Jikei, M.; Hyperbranched polymers: a promising new class of materials; *Progress in Polymer Science*; vol. 26, No. 8; pp. 1233-1285 (2001).
Kim, Y. et al.; Hyperbranched polymers 10 years after; *Journal of Polymer Science, Part A: Polymer Chemistry*; vol. 36, No. 11; pp. 1685-1698 (1998).
Kim, Y.H et al.; Hyperbranched polyphenylenes. *Polymer Preprints (American Chemical Society, Division of Polymer Chemistry*; vol. 29, No. 2; pp. 310-311 (1988).
Maier, S. et al; Synthesis of poly(glycerol)-block-poly(methyl acrylate) multi-arm star polymers; *Macromolecular Rapid Communications*; vol. 21, No. 5; pp. 226-230 (2000).

(Continued)

*Primary Examiner*—Bernard Lipman
(74) *Attorney, Agent, or Firm*—Leydig, Voit & Mayer, Ltd.

(57) ABSTRACT

A novel polymeric co-initiator is disclosed comprising a dendritic polymer core with at least one co-initiating functional group as an end group. The polymeric co-initiators are useful in radiation curable compositions such as varnishes, lacquers and printing inks and are especially useful in radiation curable inkjet inks. The dendritic polymeric core is preferably a hyperbranched polymer.

8 Claims, No Drawings

OTHER PUBLICATIONS

Mc Cutcheon; Functional Materials, North American Edition; Glen Rock, N.J.: Manufacturing Confectioner Publishing Co.; pp. 110-129 (1990).

Radke, W. et al.; Effect of Core-Forming Molecules on Molecular Weight Distribution and Degree of Branching in the Synthesis of Hyperbranched Polymers; *Macromolecules*; vol. 31, No. 2; pp. 239-248 (1998).

Sunder, A. et al.; Controlled Synthesis of Hyperbranched Polyglycerols by Ring-Opening Multibranching Polymerization; *Macromolecules*; vol. 32, No. 13; pp. 4240-4246 (1999).

Sunder, A. et al.; Controlling the growth of polymer tress: concepts and perspectives for hyperbranched polymers; *Chemistry- A European Journal*; vol. 6, No. 14; pp. 2499-2506 (2000).

Sunder, A. et al.; Hyperbranched Polyether-Polyols Based on Polyglycerol: Polarity Design by Block Copolymerization with Propylene Oxide; *Macromolecules*; vol. 33, No. 2; pp. 309-314 (2000).

Tokar, R. et al.; Cationic polymerization of glycidol: coexistence of the activated monomer and active chain end mechanism; *Macromolecules*; vol. 27, p. 320 (1994).

Tomalia et al.; A new class of polymers: starburst-dendritic macromolecules. *Polymer J.*; vol. 17; p. 117 (1985).

Vandenberg, E.J.; Polymerization of glycidol and its derivatives: a new rearrangement polymerization; *Journal of Polymer Science*; vol. 23, No. 4.; pp. 915-949 (1985).

Voit, B. et al.; New Developments in hyperbranched polymers; *Journal of Polymer Science, Part A; Polymer Chemistry*; vol. 38, No. 14, pp. 2505-2525 (2000).

European Search Report in 04 10 3391 (Sep. 2, 2005).

* cited by examiner

POLYMERIC CO-INITIATORS

CROSS-REFERENCE TO RELATED PATENT APPLICATIONS

This application claims the benefit of U.S. Provisional Application No. 60/601,886 filed Aug. 16, 2004, which is incorporated by reference. In addition, this application claims the benefit of European Application No. 04103395.2 filed Jul. 15, 2004, which is also incorporated by reference.

TECHNICAL FIELD

The present invention relates to novel polymeric co-initiators, useful in radiation curable compositions such as varnishes, lacquers and printing inks, e.g. radiation curable inkjet inks.

BACKGROUND ART

Commercial radiation curable inkjet inks generally contain significant amounts of low molecular weight co-initiators, such as ethyl-4-dimethylaminobenzoate or N-methyl-diethanolamine. This co-initiator is used in combination with a Norrish type II-initiator to accelerate the radiation curing process. No problem arises if all of the co-initiator is consumed and built into the polymeric network. However, hydrogen transfer from the co-initiator to the Norrish type II-initiator is rarely quantitative, resulting in unreacted co-initiator. In food packaging printed upon with a radiation curable composition, this unreacted co-initiator remains mobile and if toxic will cause health risks upon being extracted into the food. Unreacted co-initiators are also known to adversely affect the physical properties of the packaging material.

One approach in solving these problems is to design co-initiators with a higher molecular weight.

JP 2000086713 (TOYO INK) discloses the use of the reaction product of an unsaturated monomer bearing (meth)acryloyl groups or vinyl ether groups having an number average molecular weight of more than 500 with a primary or secondary amine as co-initiator in radiation curable compositions. However, using this approach only co-initiators with low functionality can be obtained.

EP 434098 A (UNION CARBIDE) discloses the use of amino terminated polyoxyalkylenes as co-initiators in radiation curable compositions. The claimed polyoxyalkylenes also have a low functionality, requiring the use of large amounts of unreactive polymer in the matrix compared to low molecular weight co-initiators.

The combination of a co-initiator and an initiator in a conventional linear polymer geometry has been described by ANGIOLINI, et al. Polymeric photoinitiators based on sidechain benzoin methyl ether and tertiary amine moieties for fast UV-curable coatings. *Polymers for Advanced Technologies.* 1993, vol.4, no.6, p. 375-384. Although potentially interesting to reduce extractable residues, the linear geometry of the polymer increases the solution viscosity of the formulations to an undesirable level for a great number of applications with radiation curable compositions, e.g. inkjet inks and lacquers.

WO 9907746 (DSM) discloses a radiation-curable resin composition containing at least a radiation-curable resin, a photo-excitable compound and an aliphatic amine, characterized in that as amine is chosen a compound containing at least one tertiary amino group, at least one substituent of the tertiary amino group being an aliphatic chain containing at least one electron-withdrawing group, excluding the case where the aliphatic amine consists of one tertiary amine group with the aliphatic chain being a cyanoethyl group and the other two substituents of the tertiary amino group forming part of an alkyl ring with 4 or 5 carbon atoms.

In a preferred embodiment and in all of the examples, Astramol™-dendrimers, commercially available from DSM, are used as co-initiator in comparison with low molecular compounds. However, the low generation dendrimers are in fact low molecular weight compounds, while higher generations require laborious synthetic work, making them too expensive for several applications. A further derivatization of these compounds to compatibilize them with different radiation curable compositions is impossible. The same Astramol™-dendrimers are described in WO 9903930 (DSM) in combination with maleimides as initiator.

WO 0222700 (PERSTORP SPECIALTY CHEM) discloses a radiation curable dendritic oligomer or polymer, characterized in that the radiation curable dendritic oligomer or polymer normally has at least one terminal group of Formula (A):

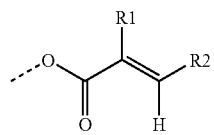

Formula (A)

and normally at least one terminal group of Formula (B):

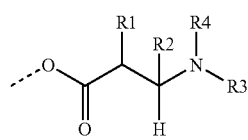

Formula (B)

wherein R1 and R2 individually are hydrogen or methyl and wherein R3 and R4 individually are alkyl, aryl, alkylaryl, arylalkyl, alkylalkoxy, arylalkoxy, said alkyl and/or said aryl optionally having one or more hydroxyl groups. The dendritic polymers are claimed to be of particular of interest for curing under air compared to conventional curable dendritic oligomers. However, these oligomeric co-initiators tend to lose their effectiveness when coupled to a polymer, which does not contain acrylates, as stated in DAVIDSON, Stephen R. Exploring the Science Technology and Applications of UV and EB-curing. LONDON, UK: SITA Technology Ltd, 1999. p. 141. and DAVIDSON, Stephen R., et al. Type II polymeric photoinitiators (polyetherimides) with built-in amine synergist. *Journal of Photochemistry and Photobiology, A: Chemistry.* 1995, vol.91, no.2, p. 153-163.

There is therefore a need to provide cheap, effective co-initiators suitable for radiation curable compositions for use on food packaging with these co-initiators not being extractable into food or adversely affecting the physical properties of the packaging material. The co-initiator should be easy to manufacture and should be compatible with a wide range of radiation curable compositions without causing high solution viscosity.

OBJECTS OF THE INVENTION

It is an object of the present invention to provide a new class of very effective polymeric co-initiators.

It is a further object of the present invention to provide a new class of polymeric co-initiators that are easy to manufacture and can be easily made compatible with a wide range of radiation curable compositions.

It is also an object of the present invention to provide a radiation curable composition comprising at least one of this new class of polymeric co-initiator compatible with a wide range of radiation curable compositions.

It is also an object of the present invention to provide a radiation curable inkjet ink comprising at least one of this new class of polymeric co-initiator according to the present invention that is suitable for inkjet printing on food packaging.

These and other objects of the invention will become apparent from the description hereinafter.

SUMMARY OF THE INVENTION

It was surprisingly found that polymeric co-initiators with a specific molecular geometry are at least as effective as their low molecular weight counterparts, making them especially useful for radiation curable formulations having lower amounts of extractable residues. Although the polymeric co-initiators have a high functionality, they exhibit a limited influence on viscosity.

Objects of the present invention are realized with a polymeric co-initiator comprising a dendritic polymer core with at least one co-initiating functional group as an end group.

The objects of the present invention are also realized with a radiation curable composition containing a polymeric co-initiator comprising a dendritic polymer core with at least one co-initiating functional group as an end group.

The objects of the present invention are also realized with an inkjet ink containing a polymeric co-initiator comprising a dendritic polymer core with at least one co-initiating functional group as an end group.

The objects of the present invention are also realized with a process for manufacturing a polymeric co-initiator, comprising the steps of:
a) providing a dendritic polymer core, and
b) attaching at least one co-initiator or co-initiator derivative to said dendritic polymer core as an end group.

Further advantages and embodiments of the present invention will become apparent from the following description.

DETAILED DESCRIPTION OF THE INVENTION

Definitions

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of 4 to 400 nanometers.

The term "UV" is used in disclosing the present application as an abbreviation for ultraviolet radiation.

The term "co-initiator" as used in disclosing the present invention, means any molecule capable of transferring a hydrogen to the excited state of a Norrish type II-initiator and initiating the radical polymerization of a radiation curable composition.

The term "Norrish type II-initiator" as used in disclosing the present invention, means a photoinitiator which is activated by actinic radiation and forms free radicals by hydrogen abstraction or electron extraction from a second compound that becomes the actual initiating free radical.

The term "branched polymer" as used in disclosing the present invention, means a polymer chain having branch points that connect three or more polymeric chain segments.

The term "DB" is used in disclosing the present application as an abbreviation for degree of branching.

The term "dendritic polymer" as used in disclosing the present invention, comprises dendrimers and hyperbranched polymers.

The term "hyperbranched polymer" as used in disclosing the present invention, means a polymer having a plurality of branch points and multifunctional branches that lead to further branching with polymer growth. Hyperbranched polymers are obtained by a one-step polymerization process and form a polydisperse system with varying degrees of branching (DB<100%).

The term "dendrimers" as used in disclosing the present invention, means well-defined monodisperse structures in which all branch points are used (DB=100%). Dendrimers are obtained by a multi-step synthesis.

The term "functional group" as used in disclosing the present invention, means an atom or group of atoms, acting as a unit, that has replaced a hydrogen atom in a hydrocarbon molecule and whose presence imparts characteristic properties to this molecule.

The term "low functionality" as used in disclosing the present invention, means having not more than five functional groups.

The term "end group" as used in disclosing the present invention, means the terminal group on a branch. In the case of a dendrimer or hyperbranched polymer, a plurality of end groups is present.

The term "co-initiating functional group" as used in disclosing the present invention, means a functional group that renders the molecule capable of functioning as a co-initiator.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "acyl group" as used in disclosing the present invention means
—(C=O)-aryl and —(C=O)-alkyl groups.

The term "aliphatic group" as used in disclosing the present invention means saturated straight chain, branched chain and alicyclic hydrocarbon groups.

The term "aryl group" as used in disclosing the present invention means an assemblage of cyclic conjugated carbon atoms, which are characterized by large resonance energies, e.g. benzene, naphthalene and anthracene.

The term "alicyclic hydrocarbon group" means an assemblage of cyclic conjugated carbon atoms, which do not form an aromatic group, e.g. cyclohexane.

Dendritic Polymers

The polymeric co-initiator according to the present invention contains a core of dendritic polymer, e.g. a dendrimer or a hyperbranched polymer. The polymeric co-initiator according to the present invention has preferably a core of hyperbranched polymer.

Dendrimers are characterized by cascade-type branching, i.e. a branch-on-branch topology. Dendrimers are prepared in a multi-step synthesis, based on repeated branching and deprotection schemes as disclosed by NEWCOME, G. R., et al. Dendritic Molecules: Concepts, Synthesis, Perspectives. VCH: WEINHEIM, 2001. Dendrimer synthesis strategies generally aim at fully branched polymers, although in recently reported examples a fraction of imperfectly branched species has been reported as (undesired) side-products. Suitable dendrimers are polyamidoamine (PAMAM) Starburst™ dendrimers as disclosed by TOMALIA, et al. A new class of polymers: starburst-dendritic macromolecules. *Polym. J.* 1985, vol.17, p. 117. and convergently prepared polybenzylether dendrimers as disclosed by HAWKER, et al. Preparation of polymers with controlled molecular architecture. A new convergent approach to dendritic macromolecules. *J. Am. Chem. Soc.* 1990, vol.112, p. 7638.

Synthesis

The stepwise preparation, which represents the only strategy for the preparation of dendrimers at present, is a limiting factor for most applications. In contrast to dendrimers, the structurally irregular, i. e. hyperbranched polymers are obtained in a single synthetic step.

In the present invention both polymers obtained by strict hyperbranching polymerization as well as polymers obtained by subcritical polymerization of e.g. $A_2+B_3$ types of monomers are considered as hyperbranched.

A stringent criterion for strict hyperbranching polymerization is that no critical conversion $p_c$ may exist, at which gelation of the system occurs and a network structure is obtained, as disclosed by BURCHARD, W. Solution properties of branched macromolecules. *Advances in Polymer Science*. 1999, vol.143, no. II, p. 113-194.

Hyperbranched materials can thus be obtained by polycondensation of $AB_2$ or $AB_m$-type monomers with complementary functionality's A and B, the only coupling reaction in the system being the linking of A and B. Details on this type of polyfunctional polycondensation are disclosed by FLORY, P. J. Molecular size distribution in three-dimensional polymers. VI.

Branched polymer containing A-R-Bf-1-type units. *Journal of the American Chemical Society*. 1952, vol.74, p. 2718-2723.

U.S. Pat. No. 4,857,630 (DU PONT) and KIM, Y. H., et al. Hyperbranched polyphenylenes. *Polymer Preprints (American Chemical Society, Division of Polymer Chemistry)*. 1988, vol.29, no.2, p. 310-311. disclose synthesis methods for preparing hyperbranched polyphenylenes.

Methods for preparing hyperbranched polymers based on polycondensation of $AB_2$-monomers are further disclosed in U.S. Pat. No. 5,196,502 (KODAK), U.S. Pat. No. 5,225,522 (KODAK) and U.S. Pat. No. 5,214,122 (KODAK).

Another suitable approach for preparing hyperbranched polymer structures is the polymerization of linear AB*-type inimers. Inimers are compounds that possess a common, linearly polymerizable moiety, such as a vinyl group or a strained cyclic component as well as an initiating group in the same molecule. Cyclic inimers have been used in the preparation of hyperbranched structures by VANDENBERG, E. J. Polymerization of glycidol and its derivatives: a new rearrangement polymerization. *Journal of Polymer Science*. 1985, vol.23, no.4, p. 915-949., FRECHET, J. Self-condensing vinyl polymerization: an approach to dendritic materials. *Science* (Washington, D.C.). 1995, vol.269, no.5227, p. 1080-1083. and EP 791021 A (CORNELL RES FOUNDATION INC).

Linear AB type compounds, commonly called "linear co-monomers" as well as poly-B-functional compounds of $B_f$-structure may be present, commonly designated "core molecules". An overview of the structural possibilities as well as a stringent definition for the degree of branching DB, a relevant parameter for the functionality of hyperbranched polymers is disclosed by HOLTER, D., et al. Degree of branching in hyperbranched polymers. *Acta Polymerica*. 1997, vol.23, no.48, p. 30-35., HOLTER, E. J., et al. Degree of branching (DB) in hyperbranched polymers. Part 2. Enhancement of the DB. Scope and limitations. *Acta Polymerica*. 1997, vol.48, no.8, p. 298-309. and FREY, H., et al. Degree of branching in hyperbranched polymers. Part 3. Copolymerization of ABm monomers with AB and ABn monomers. *Journal of Polymer Science*. 1999, vol.50, no.2-3, p. 67-76.

The state of the art in hyperbranched polymer research has been reviewed in:

(a) JIKEI, M. Hyperbranched polymers: a promising new class of materials. *Progress in Polymer Science*. 2001, vol.26, no.8, p. 1233-1285.

(b) NEWCOME, G. R., et al. Dendritic Molecules: Concepts, Synthesis, Perspectives. VCH: WEINHEIM, 2001.

(c) KIM, Y., et al. Hyperbranched polymers 10 years after. *Journal of Polymer Science, Part A: Polymer Chemistry*. 1998, vol.36, no.11, p. 1685-1698.

(d) VOIT, B., et al. New developments in hyperbranched polymers. *Journal of Polymer Science, Part A: Polymer Chemistry*. 2000, vol.38, no.14, p. 2505-2525.

(e) SUNDER, A., et al. Controlling the growth of polymer trees: concepts and perspectives for hyperbranched polymers. *Chemistry—A European Journal*. 2000, vol.6, no.14, p. 2499-2506.

From these reviews, it is evident that hyperbranched polymers are clearly distinguishable from the regularly branched dendrimers as well as from branched structures based on $A_2+B_3$ polymerization of two polyfunctional monomers that inevitably leads to gelation, i.e. network formation, if polymerization is not stopped at a subcritical level.

Hyperbranched polymers commonly possess broad molecular weight distribution. The polydispersity $M_w/M_n$ is usually greater than 5 and more often greater than 10. Recently new concepts have been introduced that are based on the slow addition of $AB_2$ or latent $AB_2$ monomers of suitable reactivity to a polyfunctional $(B_f)$ core molecule. The procedure is disclosed by RADKE, W., et al. Effect of Core-Forming Molecules on Molecular Weight Distribution and Degree of Branching in the Synthesis of Hyperbranched Polymers. *Macromolecules*. 1998, vol.31, no.2, p. 239-248. and HANSELMANN, R., et al. Hyperbranched Polymers Prepared via the Core-Dilution/Slow Addition Technique: Computer Simulation of Molecular Weight Distribution and Degree of Branching. *Macromolecules*. 1998, vol.31, no.12, p. 3790-3801.

Hyperbranched Polymer Core

The size of the hyperbranched polymer core for a polymeric co-initiator according to the present invention is determined by the selected application. Most inkjet applications require inkjet inks with a low viscosity, usually lower than 100 mPa.s. Hence for inkjet applications, the hyperbranched polymers preferably have a $M_w$ smaller than 100,000, more preferably smaller than 50,000 and most preferably smaller than 20,000.

The hyperbranched polymer core for a polymeric co-initiator according to the present invention is preferably obtained by the method of slow monomer addition. This results in a narrow polydispersity of the hyperbranched polymers. Particularly preferred in the present invention are hyperbranched polymers with a polydispersity $M_w/M_n$ smaller than 3.

Suitable hyperbranched polymer cores are disclosed in GAO, C., et al. Hyperbranched polymers: from synthesis to applications. *Progress in Polymer Science*. 2000, vol.29, no.3, p. 183-275.

Other suitable hyperbranched polymer cores are given in Table 1, without being limited thereto.

TABLE 1
PC-1
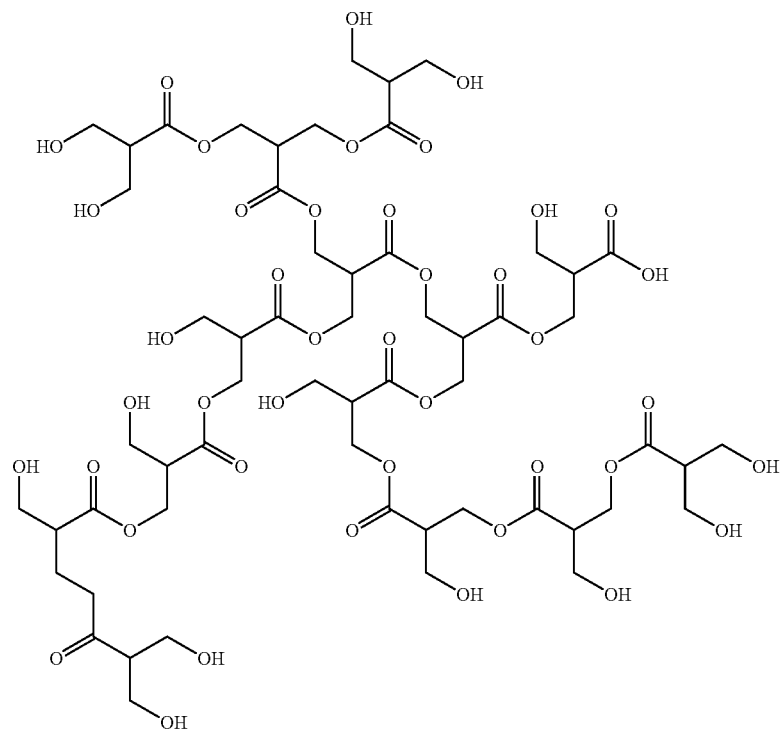
PC-2
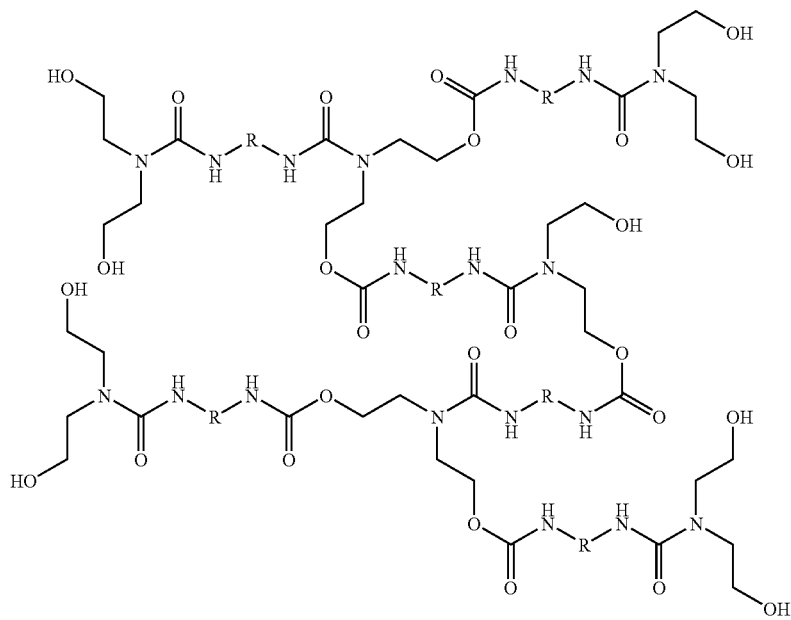
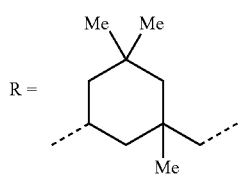

TABLE 1-continued
PC-3
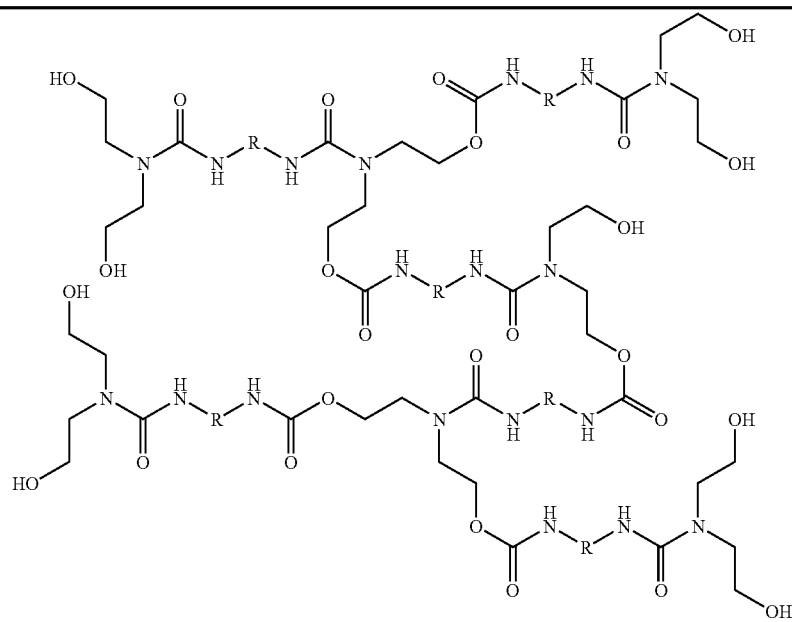
PC-4
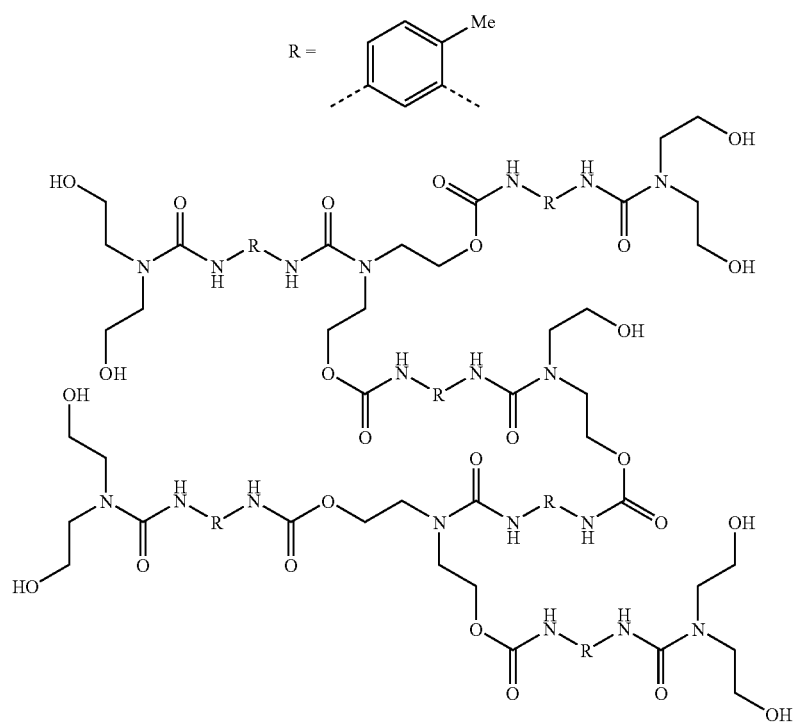
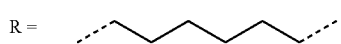

TABLE 1-continued
PC-5
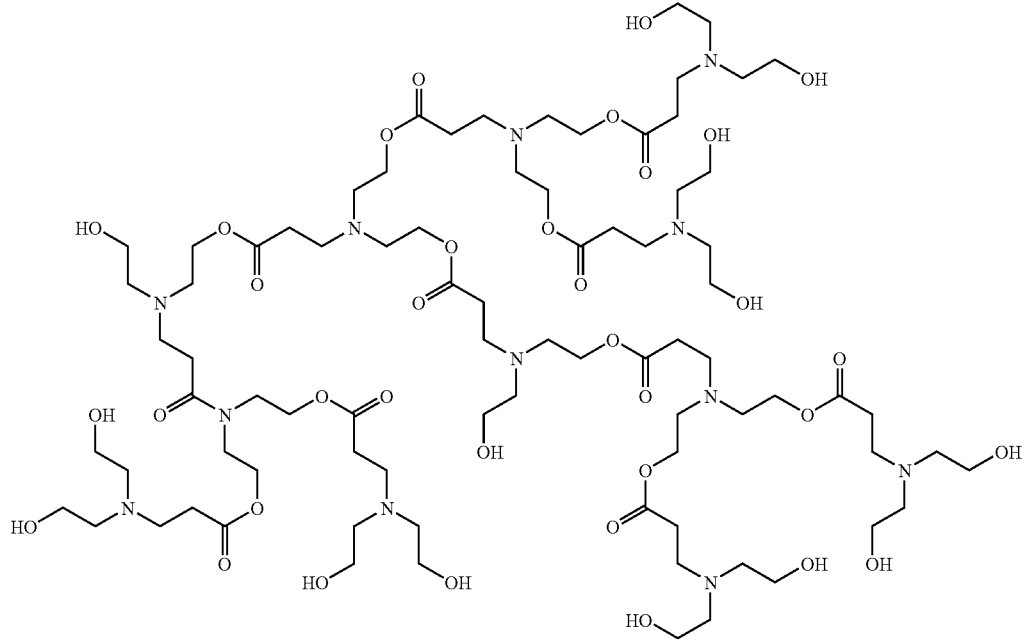
PC-6
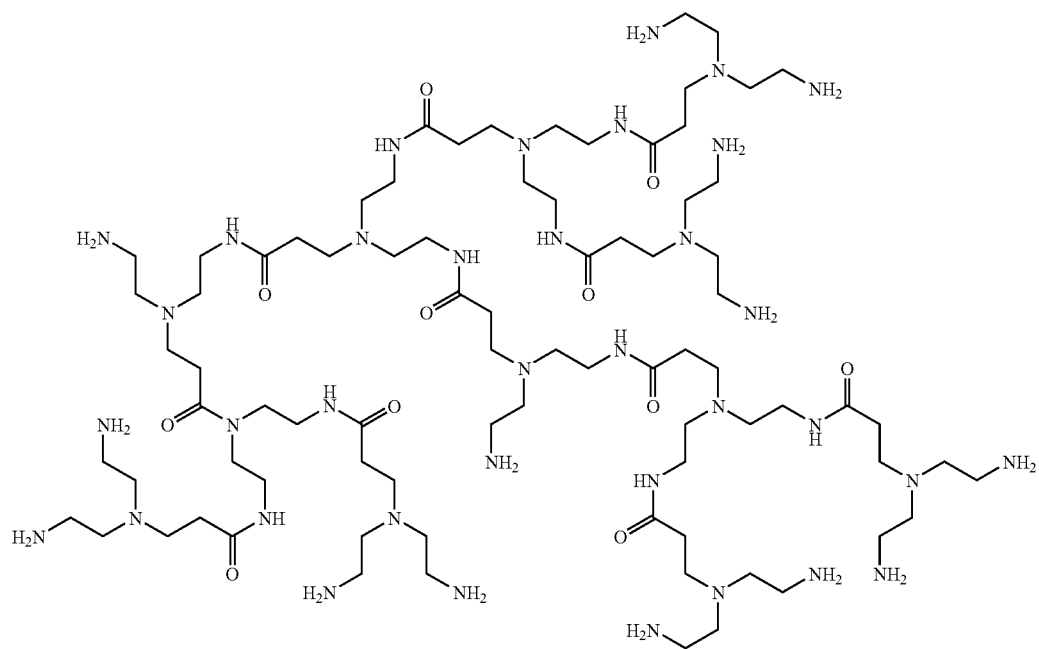

TABLE 1-continued
PC-7
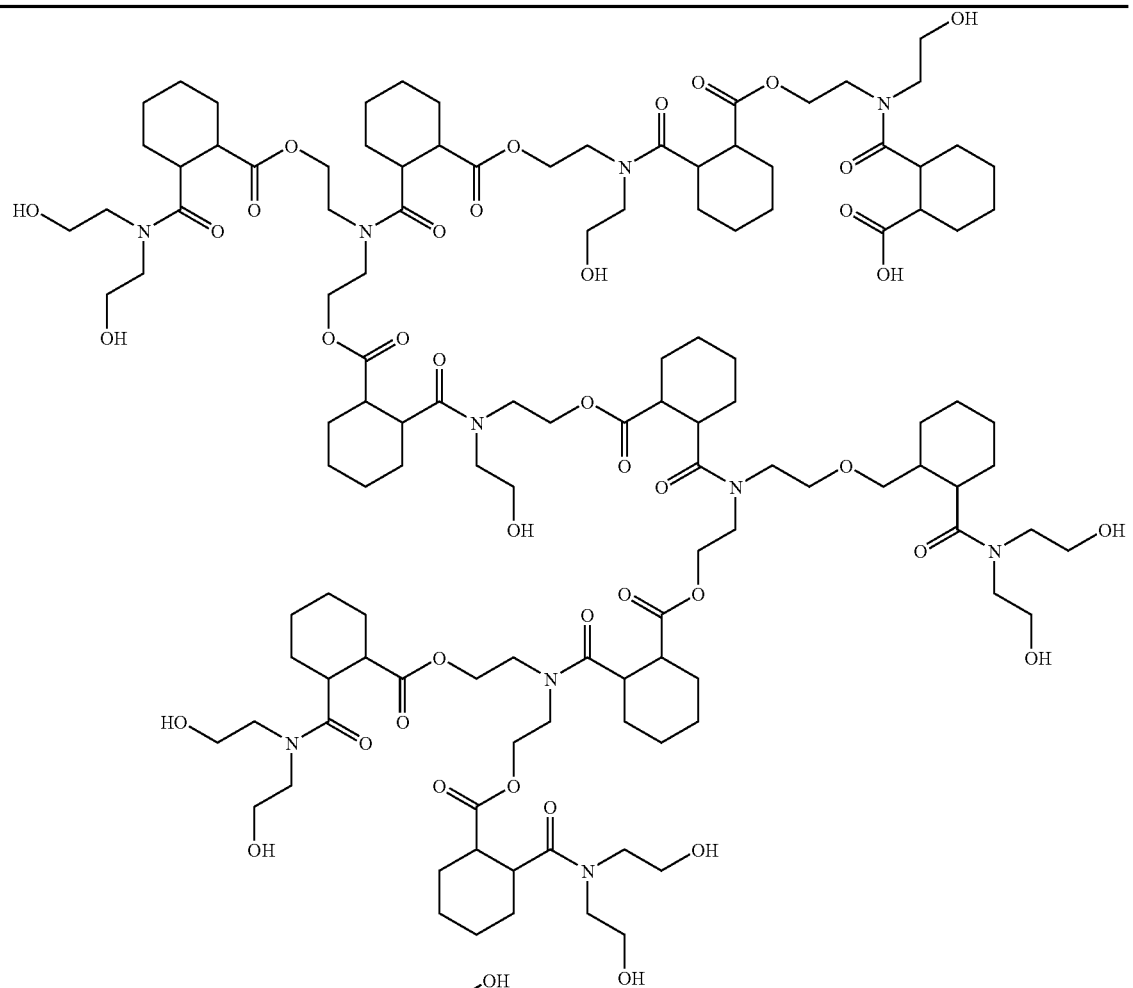
PC-8
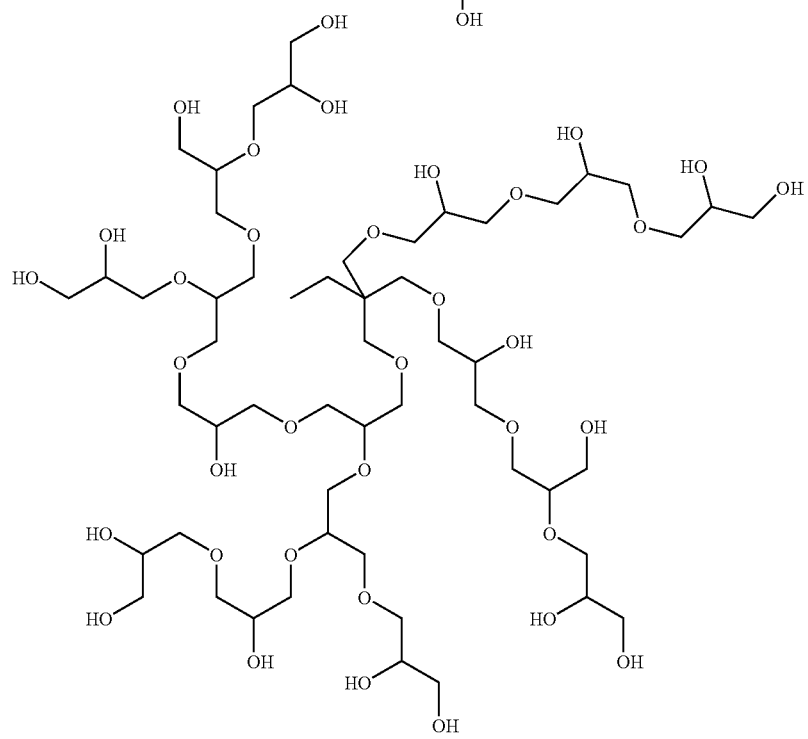

The hyperbranched polymer core can be used as a core for terminal grafting before derivatization with a reactive co-initiator (derivative). This yields a hyperbranched multiple arm graft star copolymer, which is also considered to be a hyperbranched polymer core according to the present invention. Suitable examples of this type of polymers are disclosed in SUNDER, A., et al. Hyperbranched Polyether-Polyols Based on Polyglycerol: Polarity Design by Block Copolymerization with Propylene Oxide. *Macromolecules*. 2000, vol.33, no.2, p. 309-314. and MAIER, S., et al. Synthesis of poly(glycerol)-block-poly(methyl acrylate) multi-arm star polymers. *Macromolecular Rapid Communications*. 2000, vol.21, no.5, p. 226-230.

Any hyperbranched polymer can be used as a polymer core in the polymeric co-initiators, but hyperbranched polyglycidols or hyperbranched copolymers of glycidol and other epoxides are particularly preferred. They can be readily prepared with a narrow molecular weight distribution in a single step procedure from commercially available monomers over a broad range of molecular weights. The reaction of these core polymers with at least one co-initiator or co-initiator derivative yields a particularly preferred class of hyperbranched polymeric co-initiators according to the present invention.

Branched polyols based on glycerol units are usually prepared by reacting glycidol with a hydrogen-containing compound (e.g., glycerol) in the presence of inorganic acids as disclosed by JP 61043627 A (DAICEL CHEM IND.) or organic acids as disclosed by JP 58198429 A (NIPPON YUSHI) as catalyst. The polymerization of glycidol can also be achieved via cationic polymerization using cationic initiators, such as $BF_3$ as disclosed by TOKAR, R., et al. Cationic polymerisation of glycidol: coexistence of the activated monomer and active chain end mechanism. *Macromolecules*. 1994, vol.27, p. 320. and DWORAK, A., et al. Cationic polymerization of glycidol. Polymer structure and polymerization mechanism. *Macromolecular Chemistry and Physics*. 1995, vol.196, no.6, p. 1963-1970. However, a cationic polymerization method leads to hyperbranched polymer with a polydispersity larger than 3 and molecular weights can not be controlled.

A suitable procedure for the preparation of hyperbranched polyglycerols with a controlled molecular weight is disclosed in DE 19947631 A (BAYER). This is achieved by adding glycidol diluted in a hydrocarbon or an ether to a suitable polyol initiator that is dissolved in diglyme or another hydrocarbon as disclosed in SUNDER, A., et al. Controlled Synthesis of Hyperbranched Polyglycerols by Ring-Opening Multibranching Polymerization. *Macromolecules*. 1999, vol.32, no.13, p. 4240-4246. The monomer is added as solution containing between 20 and 99.9 wt %, e.g., 60%-90% THF. Full incorporation of an initiator is promoted by the use of a polyfunctional initiator.

Co-Initiators

A polymeric co-initiator according to the present invention comprises a dendritic polymer core with at least one co-initiating functional group as an end group. It is essential that the co-initiating functional group is present as an end group on the polymer core. A co-initiating functional group present in the core of the polymeric structure looses it effectiveness due to steric reasons.

The polymeric co-initiators are obtained by reaction of at least one co-initiator or co-initiator derivative and a dendritic polymer core. Preferably, the polymeric co-initiators have at least five co-initiating functional groups as end groups on the dendritic polymer core, and most preferably at least 7 co-initiating functional groups as end groups.

Any co-initiator or co-initiator derivative known in the prior art can be used. A preferred co-initiator or co-initiator derivative for creating the co-initiating functional group on the dendritic polymer core is selected from the group consisting of an aliphatic amine, an aromatic amine and a thiol. Tertiary amines, heterocyclic thiols and 4-dialkylamino-benzoic acid derivatives are particularly preferred.

Suitable co-initiators according to the present invention, which can be attached as a co-initiating functional group to the polymer core, are given in Table 2 without being limited thereto.

TABLE 2

| | |
|---|---|
| SYN-1 | 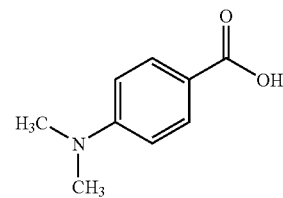 |
| SYN-2 | 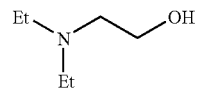 |
| SYN-3 | 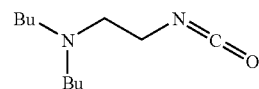 |
| SYN-4 | 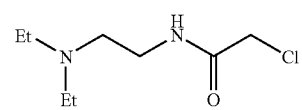 |
| SYN-5 | 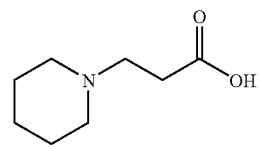 |

TABLE 2-continued

| | |
|---|---|
| SYN-6 | 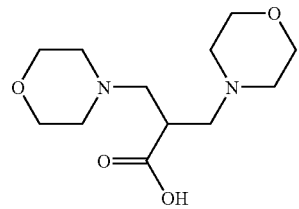 |
| SYN-7 | 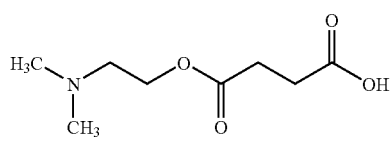 |
| SYN-8 | 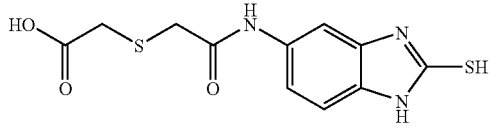 |
| SYN-9 | 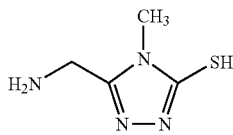 |
| SYN-10 | 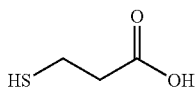 |
| SYN-11 | 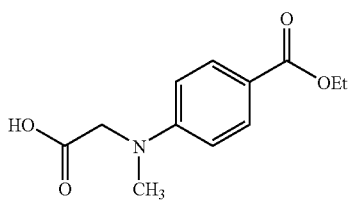 |
| SYN-12 | 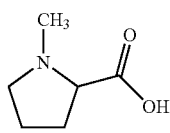 |

TABLE 2-continued

| | |
|---|---|
| SYN-13 | 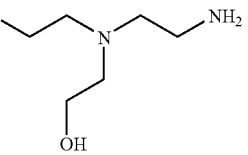 |
| SYN-14 | 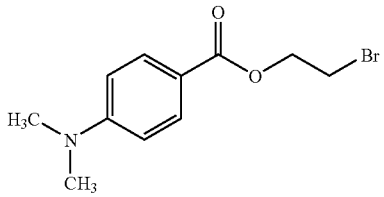 |
| SYN-15 | 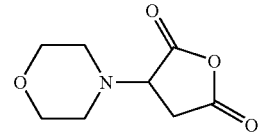 |

The dendritic polymer core can be fully or partially derivatized.

It is evident for those skilled in the art that many types of derivatization chemistry can be used in the synthesis of the polymeric co-initiators. In the case of hyperbranched polyglycidols, esterification and etherification is particularly preferred.

In a preferred embodiment, the polymeric co-initiators are further derivatized with a compatibilizing group. A compatibilizing group is defined as a functional group making the polymeric co-initiator more soluble in a specific radiation curable composition.

Suitable examples of polymeric co-initiators for use in a radiation curable composition according to the present invention are given below, without being limited thereto. The structures given represent one molecular weight with one degree of derivatization out of the distribution found in each prepared sample. The structures represent a more generic structure, as a specific example for different molecular weights and degrees of substitution. It is obvious for those skilled in the art that each polymer sample is a mixture of similar individual compounds, differing in both molecular weight and degree of substitution and that the chemistry can be extended over a wide range of molecular weights.

Suitable polymeric co-initiators according to the present invention have a hyperbranched polyether core. Example of a hyperbranched polyether core:

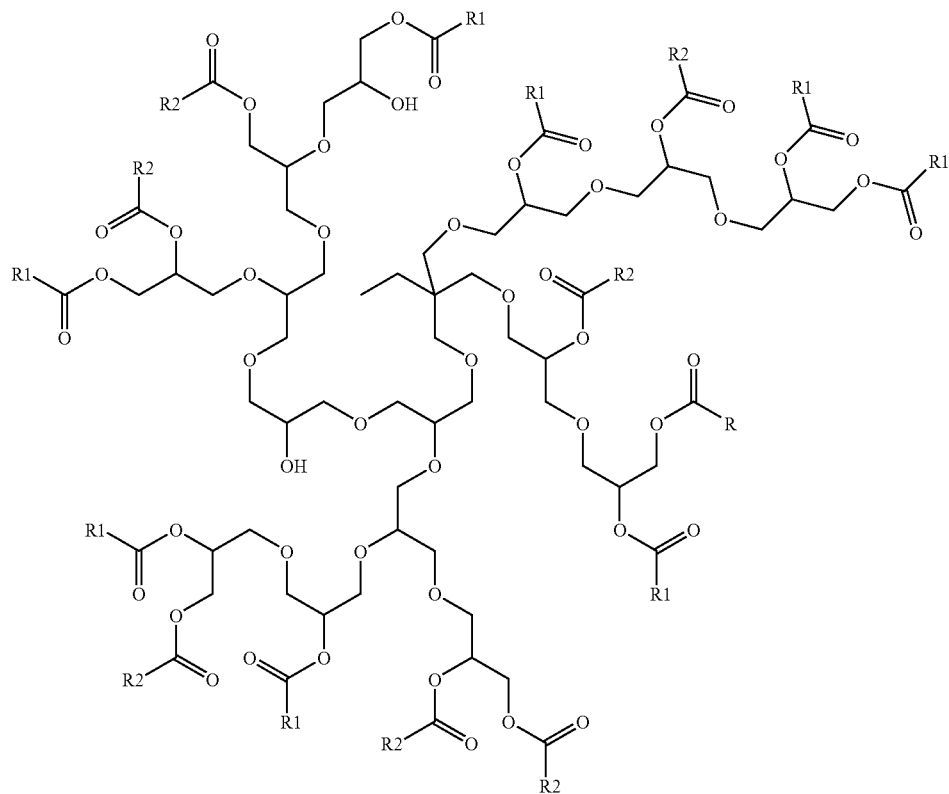

Suitable polymeric co-initiators according to the present invention have a hyperbranched polyether core, as displayed above, to which a co-initiating functional group and optionally a compatibilizing group can be attached using the compounds displayed in Table 3, without being limited thereto.

TABLE 3

|  | Co-initiator R1—COOH | Compatibilizer R2—COOH |
|---|---|---|
| PE-1 | 4-(dimethylamino)benzoic acid | isobutyric acid (2,2-dimethylpropanoic acid analog) |
| PE-2 | 4-(dimethylamino)benzoic acid | 2-(2-methoxyethoxy)acetic acid |
| PE-3 | 3-(piperidin-1-yl)propanoic acid | 2-(2-methoxyethoxy)acetic acid |

TABLE 3-continued

| | Co-initiator R1—COOH | Compatibilizer R2—COOH |
|---|---|---|
| PE-4 | HOOC-CH2-CH2-C(=O)-O-CH2-CH2-N(Et)2 | HOOC-CH2-O-CH2-CH2-O-CH2-CH2-O-CH3 |
| PE-5 | 3-(morpholin-4-yl)-2-(morpholin-4-ylmethyl)propanoic acid | H3C-COOH |
| PE-6 | HOOC-CH2-S-CH2-C(=O)-NH-(2-mercapto-1H-benzimidazol-6-yl) | HOOC-CH2-CH2-C(=O)-O-CH2-CH(CH3)2 |
| PE-7 | 4-(dimethylamino)benzoic acid | HOOC-CH2-O-CH2-CH2-O-CH2-CH2-O-CH3 |

Suitable polymeric co-initiators according to the present invention have a hyperbranched polyester core. Example of a hyperbranched polyester core:

above, to which a co-initiating functional group and optionally a compatibilizing group can be attached using the compounds displayed in Table 4, without being limited thereto.

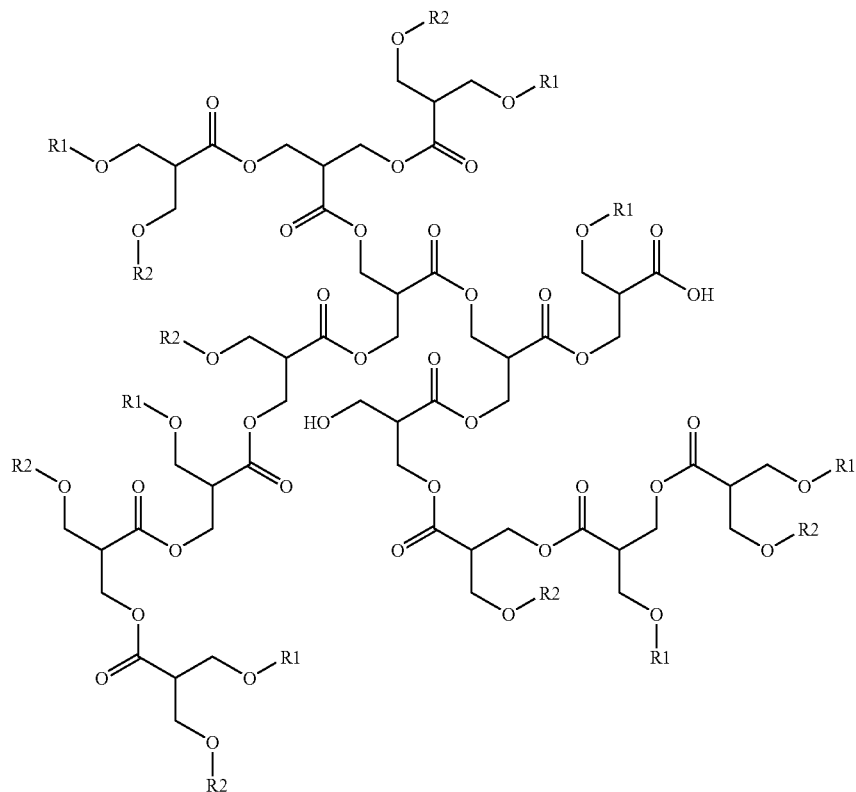

Suitable polymeric co-initiators according to the present invention have a hyperbranched polyester core, as displayed

TABLE 4

|  | Co-initiator R1—X | Compatibilizer R2—X |
|---|---|---|
| PES-1 | Et₂N-CH₂CH₂-Br | MeO-CH₂CH₂-O-CH₂CH₂-OTs |
| PES-2 | 4-(Me₂N)C₆H₄-C(O)O-CH₂CH₂-Br | Br-CH₂CH₂-C(O)OH |
| PES-3 | 4-(Me₂N)C₆H₄-C(O)Cl | MeO-CH₂CH₂-O-CH₂CH₂-C(O)Cl |

TABLE 4-continued

| | Co-initiator R1—X | Compatibilizer R2—X |
|---|---|---|
| PES-4 | 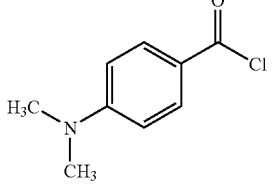 | 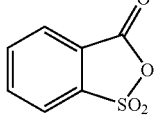 |
| PES-5 | 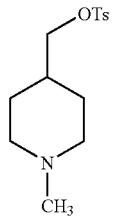 | 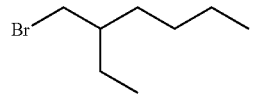 |

Suitable polymeric co-initiators according to the present invention have a hyperbranched polyamide core. Example of a hyperbranched polyamide core:

Suitable polymeric co-initiators according to the present invention have a hyperbranched polyamide core, as displayed above, to which a co-initiating functional group and option-

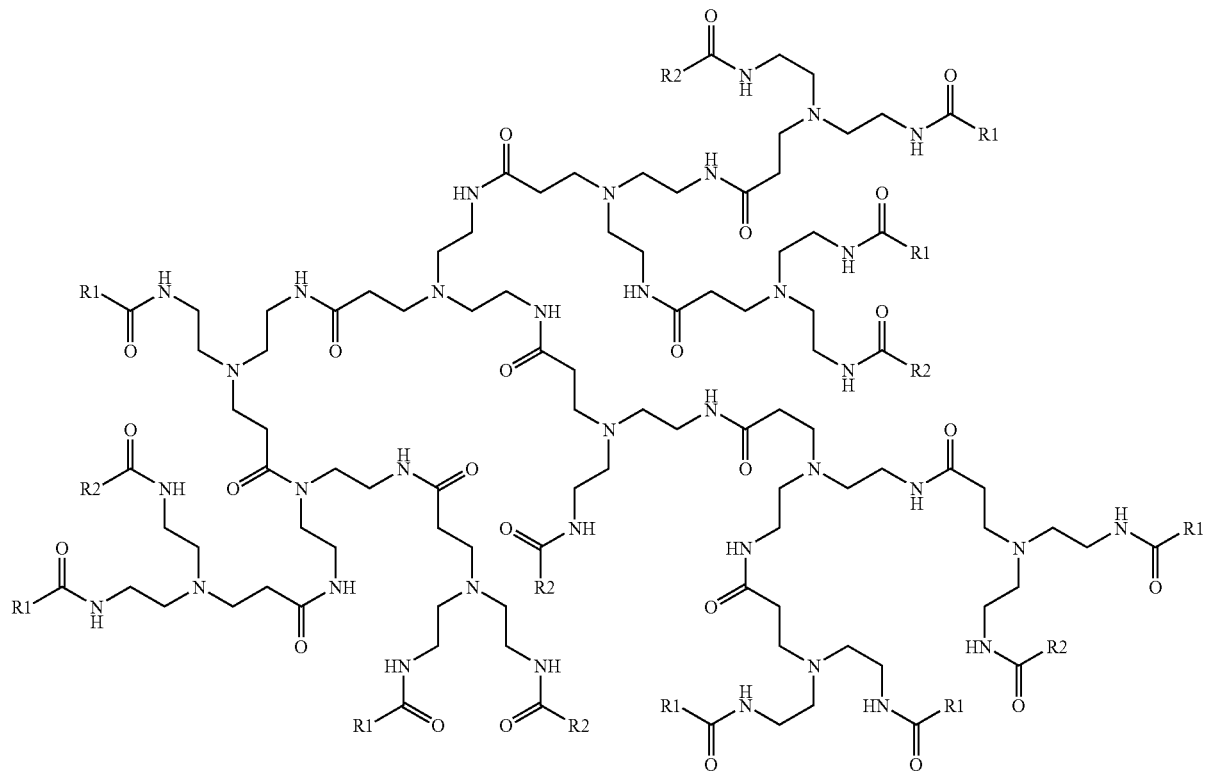

ally a compatibilizing group can be attached using the compounds displayed in Table 5, without being limited thereto.

TABLE 5

| | Co-initiator R1—COOH | Compatibilizer R2—COOH |
|---|---|---|
| PAM-1 | 4-(dimethylamino)benzoic acid structure | 2-hydroxy-2-methylpropanoic acid structure |
| PAM-2 | 3-(piperidin-1-yl)propanoic acid structure | 2-methoxypropanoic acid structure |
| PAM-3 | N,N-dibutyl-aminoethoxy-propanoic acid structure | 2-sulfosalicylic acid structure |
| PAM-4 | 2-((5-mercapto-1,3,4-thiadiazol-2-yl)thio)propanoic acid structure | gluconic acid structure |
| PAM-5 | 3-mercaptopropanoic acid structure | 2,4-di-tert-pentylphenoxyacetic acid structure |

Radiation Curable Composition

The polymeric co-initiator according to the present invention can be used in any radiation curable composition such as a varnish, a lacquer and a printing ink, and especially useful in radiation curable inkjet inks.

The radiation curable inkjet ink is preferably jetted on an inkjet recording element chosen from the group consisting of paper, coated paper, polyolefin coated paper, cardboard, wood, composite boards, plastic, coated plastic, canvas, textile, metal, glasses, plant fibre products, leather, magnetic materials and ceramics.

The radiation curable inkjet ink jetted on an inkjet recording element creates an uncured printed image. This printed image is cured by radiation or electron beam exposure. A preferred means of radiation curing is ultraviolet light.

Radiation-Curable Inkjet Ink

A radiation-curable inkjet ink contains at least three components: (i) a radiation-curable compound, (ii) a Norrish type II initiator, and (iii) a polymeric co-initiator according to the present invention. A preferred amount of the polymeric co-initiator is 1-50 wt % of the total ink weight, and more preferably 1 to 25 wt % of the total ink weight.

The radiation-curable compound can be selected from monomers and/or oligomers that can be polymerized by a curing means of an inkjet printer.

The radiation-curable inkjet ink preferably further contains at least one colorant, i.e. pigment or dye.

The radiation-curable inkjet ink may contain a polymerization inhibitor to restrain polymerization by heat or actinic radiation. It is preferred to add an inhibitor during preparation of the inkjet ink.

The radiation-curable inkjet ink may further contain at least one resin in order to obtain a stable dispersion of the colorant in the inkjet ink.

The radiation-curable inkjet ink preferably further contains at least one surfactant.

The radiation-curable inkjet ink preferably further contains at least one solvent.

The radiation-curable inkjet ink preferably further contains at least one biocide.

An inkjet printer generally uses a radiation-curable inkjet ink set consisting of a plurality of radiation-curable inkjet inks.

Radiation-Curable Compounds

The radiation curable inkjet ink contains monomers and/or oligomers, which are polymerized by the curing means of the inkjet printer.

Monomers, oligomers or prepolymers may possess different degrees of functionality, and a mixture including combinations of mono-, di-, tri- and higher functionality monomers, oligomers and/or prepolymers may be used. These components are curable, typically photo-curable, e.g. UV curable, and should adhere to the ink-receiver surface after printing and serve to bind the colorant. A mixture of two or more monomers of the same functionality is preferred. With particularly preferred a mixture of two di-functional monomers.

The viscosity of the radiation curable inkjet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is slow and expensive. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation-curable compound in the radiation curable inkjet ink, are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylates such as described in U.S. Pat. No. 6,310,115 (AGFA), 2-(vinyloxy)ethylacrylate, 2-acryloyloxyethyl-succinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4butanediol diacrylate, 1,6hexanediol diacrylate, 1,9nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri(propylene glycol)triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, caprolactam modified dipentaerythritol hexaacrylate, N-vinylamide such as N-vinylcaprolactam or N-vinylformamide; or acrylamide or a substituted acrylamide such as acryloylmorpholine; and amino functionalized polyetheracrylates such as described in U.S. Pat. No. 6,300,388 (AGFA).

Furthermore, methacrylates corresponding to the above-mentioned acrylates may be used with these acrylates. Of the methacrylates, methoxypolyethylene glycol methacrylate, methoxytriethylene glycol methacrylate, 4-(vinyloxy)butyl-methacrylate, vinyl ether acrylates such as described in U.S. Pat. No. 6,310,115 (AGFA), hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Norrish Type II Initiators

A Norrish type II initiator is a catalyst, usually called a photo-initiator, for initiating the polymerization reaction. The photo-initiator requires less energy to activate than the monomers and oligomers to form the polymer.

The photo-initiator absorbs light and is responsible for the production of free radicals or cations. Free radicals or cations are high-energy species that induce polymerization of monomers, oligomers and polymers and with polyfunctional monomers and oligomers thereby also inducing cross-linking.

A preferred amount of initiator is 1-50 wt % of the total ink weight, and more preferably 1 to 25 wt % of the total ink weight.

Irradiation with actinic radiation may be realized in two steps by changing wavelength or intensity. In such cases it is preferred to use 2 types of initiator together.

A preferred Norrish type II-initiator is selected from the group consisting of benzophenones, thioxanthones, 1,2-diketones and anthraquinones.

Suitable Norrish type II-initiators are disclosed in CRIVELLO, J. V., et al. VOLUME III: Photoinitiators for Free Radical Cationic & Anionic Photopolymerization. 2ndth edition. Edited by BRADLEY, G. London, UK: John Wiley and Sons Ltd, 1998. p. 287-294.

Colorants

Colorants may be dyes, but are preferably pigments or a combination thereof. Organic and/or inorganic pigments may be used.

The pigment particles should be sufficiently small to permit free flow of the ink through the inkjet printing device, especially at the ejecting nozzles which usually have a diameter ranging from 10 μm to 50 μm. The particle size influences also the pigment dispersion stability. It is also desirable to use small particles for maximum colour strength. The particles of the pigment dispersed in the inkjet ink should have a particle size of less than 10 μm, preferably less than 3 μm, and most preferably less than 1 μm. The average particle size of pigment particles is preferably 0.05 to 0.5 μm.

Suitable pigments include as red or magenta pigments: Pigment Red 3, 5, 19, 22, 31, 38, 43, 48: 1, 48: 2, 48: 3, 48: 4, 48: 5, 49: 1, 53: 1, 57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88; as blue or cyan pigments: Pigment Blue 1, 15, 15: 1, 15: 2, 15: 3, 15: 4, 15: 6, 16, 17-1, 22, 27, 28, 29, 36, and 60; as green pigments: Pigment green 7, 26, 36, and 50; as yellow pigments: Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185, and 193; as white pigment: Pigment White 6, 18, and 21.

Furthermore, the pigment may be chosen from those disclosed by HERBST, W, et al. Industrial Organic Pigments, Production, Properties, Applications. 2nd edition. VCH, 1997.

Most preferred pigments are Pigment Yellow 1, 3, 128, 109, 93, 17, 14, 10, 12, 13, 83, 65, 75, 74, 73, 138, 139, 154, 151, 180, 185; Pigment Red 122, 22, 23, 17, 210, 170, 188, 185, 146, 144, 176, 57:1, 184, 202, 206, 207; Pigment Blue 15:3, Pigment Blue 15:2, Pigment Blue 15:1, Pigment Blue 15:4, Pigment Blue 15:6, Pigment Blue 16 and Pigment Violet 19.

Carbon black is usually used as the colouring material in black ink. Suitable black pigment materials include carbon blacks such as Pigment Black 7 (e.g. Carbon Black MA8™ from MITSUBISHI CHEMICAL), Regal™ 400R, Mogul™ L, Elftex™ 320 from CABOT Co., or Carbon Black FW18, Special Black 250, Special Black 350, Special Black 550, Printex™ 25, Printex™ 35, Printex™ 55, Printex™ 90, Printex™ 150T from DEGUSSA. Additional examples of suitable pigments are disclosed in U.S. Pat. No. 5,538,548 (BROTHER).

The pigment is present in the range of 0.1 to 10 wt %, preferably in the range 1 to 5 wt % based on the total weight of the radiation curable inkjet ink.

Dyes suitable for the radiation curable inkjet ink include direct dyes, acidic dyes, basic dyes and reactive dyes.

Suitable direct dyes for the radiation curable inkjet ink include:
- C.I. Direct Yellow 1, 4, 8, 11, 12, 24, 26, 27, 28, 33, 39, 44, 50, 58, 85, 86, 100, 110, 120, 132, 142, and 144
- C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343
- C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237
- C.I. Direct Black 2, 3, 7, 17, 19, 22, 32, 38, 51, 56, 62, 71, 74, 75, 77, 105, 108, 112, 117, and 154

Suitable acidic dyes for the radiation curable inkjet ink include:
- C.I. Acid Yellow 2, 3, 7, 17, 19, 23, 25, 20, 38, 42, 49, 59, 61, 72, and 99
- C.I. Acid Orange 56 and 64
- C.I. Acid Red 1, 8, 14, 18, 26, 32, 37, 42, 52, 57, 72, 74, 80, 87, 115, 119, 131, 133, 134, 143, 154, 186, 249, 254, and 256
- C.I. Acid Violet 11, 34, and 75
- C.I. Acid Blue 1, 7, 9, 29, 87, 126, 138, 171, 175, 183, 234, 236, and 249
- C.I. Acid Green 9, 12, 19, 27, and 41
- C.I. Acid Black 1, 2, 7, 24, 26, 48, 52, 58, 60, 94, 107, 109, 110, 119, 131, and 155

Suitable reactive dyes for the radiation curable inkjet ink include:
- C.I. Reactive Yellow 1, 2, 3, 14, 15, 17, 37, 42, 76, 95, 168, and 175
- C.I. Reactive Red 2, 6, 11, 21, 22, 23, 24, 33, 45, 111, 112, 114, 180, 218, 226, 228, and 235
- C.I. Reactive Blue 7, 14, 15, 18, 19, 21, 25, 38, 49, 72, 77, 176, 203, 220, 230, and 235
- C.I. Reactive Orange 5, 12, 13, 35, and 95
- C.I. Reactive Brown 7, 11, 33, 37, and 46
- C.I. Reactive Green 8 and 19
- C.I. Reactive Violet 2, 4, 6, 8, 21, 22, and 25
- C.I. Reactive Black 5, 8, 31, and 39

Suitable basic dyes for the radiation curable inkjet ink include:
- C.I. Basic Yellow 11, 14, 21, and 32
- C.I. Basic Red 1, 2, 9, 12, and 13
- C.I. Basic Violet 3, 7, and 14
- C.I. Basic Blue 3, 9, 24, and 25

Dyes can only manifest the ideal colour in an appropriate range of pH value. Therefore, the radiation curable inkjet ink preferably further comprises a pH buffer, such as potassium hydroxide (KOH).

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer™ GA-80, Sumilizer™ GM and Sumilizer™ GS produced by Sumitomo Chemical Co., Ltd.

Since excessive addition of these polymerization inhibitors will lower the ink sensitivity to curing, it is preferred that the amount capable of preventing polymerization be determined prior to blending. The amount of a polymerization inhibitor is generally between 200 and 20,000 ppm of the total ink weight.

Resins

The radiation curable inkjet ink may further contain a resin, also called a pigment stabilizer or dispersant, in order to obtain a stable dispersion of the pigment(s) in the inkjet ink.

The pigments may be added to the radiation curable inkjet ink as a dispersion comprising a dispersant.

Suitable resins: petroleum type resins (e.g., styrene type, acryl type, polyester, polyurethane type, phenol type, butyral type, cellulose type, and rosin); and thermoplastic resins (e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse™ 32000 and Solsperse™ 39000 available from AVECIA, EFKA™ 4046 available from EFKA CHEMICALS BV, Disperbyk™ 168 available from BYK CHEMIE GMBH.

A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

Typically resins are incorporated at 2.5% to 200%, more preferably at 50% to 150% by weight of the pigment.

Surfactants

The radiation curable inkjet ink may contain at least one surfactant. The surfactant(s) can be anionic, cationic, nonionic, or zwitter-ionic and are usually added in a total quantity below 20 wt % based on the total ink weight and particularly in a total below 10 wt % based on the total ink weight.

A fluorinated or silicone compound may be used as a surfactant, however, a potential drawback is extraction by food from inkjet food packaging material because the surfactant does not cross-link. It is therefore preferred to use a copolymerizable monomer having surface-active effects, for example, silicone-modified acrylates, silicone modified methacrylates, fluorinated acrylates, and fluorinated methacrylates.

Solvents

The radiation curable inkjet ink may contain as a solvent, water and/or organic solvents, such as alcohols, fluorinated solvents and dipolar aprotic solvents, the solvent preferably being present in a concentration between 10 and 80 wt %, particularly preferably between 20 and 50 wt %, each based on the total weight of the radiation curable inkjet ink.

However, the radiation curable inkjet ink preferably does not contain an evaporable component, but sometimes, it can be advantageous to incorporate an extremely small amount of an organic solvent in such inks to improve adhesion to the ink-receiver surface after UV curing. In this case, the added solvent can be any amount in the range which does not cause problems of solvent resistance and VOC, and preferably 0.1-5.0 wt %, and particularly preferably 0.1-3.0 wt %, each based on the total weight of the radiation curable inkjet ink Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Biocides

Suitable biocides for the radiation curable inkjet ink include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for radiation curable inkjet ink is Proxel™ GXL available from ZENECA COLOURS.

A biocide is preferably added in an amount of 0.001 to 3 wt %, more preferably 0.01 to 1.00 wt. %, each based on the radiation curable inkjet ink.

Preparation of a Radiation Curable Inkjet Ink

A dispersion of colorant for use in the radiation curable inkjet ink may be prepared by mixing, milling and dispersion of colorant and resin. Mixing apparatuses may include a pressure kneader, an open kneader, a planetary mixer, a dissolver, and a Dalton Universal Mixer. Suitable milling and dispersion apparatuses are a colloid mill, a high-speed disperser, double rollers, a bead mill, a paint conditioner, and triple rollers. The dispersions may also be prepared using ultrasonic energy.

In the process of mixing, milling and dispersion, each process is performed with cooling to prevent build up of heat, and as much as possible under light conditions in which UV-light has been substantially excluded.

The radiation curable inkjet ink may be prepared using separate dispersions for each colorant, or alternatively several pigments may be mixed and co-milled in preparing the dispersion.

EXAMPLES

The present invention will now be described in detail by way of Examples hereinafter.

Measurement Methods

1. Curing Speed

The percentage of the maximum output of the lamp was taken as a measure for curing speed, the lower the number the higher curing speed. A sample was considered as fully cured at the moment scratching with a Q-tip caused no visual damage.

2. Method of Extraction

A sample of 3 cm in diameter was taken from each coated and cured curable composition. The sample was put in a beaker and extracted twice with 2 ml acetonitrile using ultrasound. The beaker and the sample were rinsed with 5 ml acetonitrile and the acetonitrile fractions were pooled and filtered over a Millex 0.2 μm filter. 10 mg of the reference compounds (the hyperbranched polymers or comparative compounds) were dissolved in 50 ml acetonitrile.

The samples were analyzed on a Alltime C185 μm HPLC column (Alltech) (150 mm×3.2 mm)

20 μL of the extraction samples and 5 μL of the reference compounds were injected. A step gradient elution was used using a mixture of 0.2 M $K_2HPO_4$ adjusted to pH=7 with $H_3PO_4$ and 40/60 $H_2O/CH_3CN$ at the start, switching to 40/60 $H_2O/CH_3CN$ after 11 minutes and to 10/90 $H_2O/CH_3CN$ after 19 minutes. The total peak area compared to the reference compounds was taken as a measure for the amount co-initiator extracted. Benzophenone was determined separately in the same run. When the peaks overlapped with benzophenone, the benzophenone peak area was subtracted from the total peak area to determine the concentration of the extractable co-initiators. This was calculated back to a percentage of the original amount of co-initiator in the curable composition.

3. Viscosity

The viscosity of the radiation curable composition was measured with a Brookfield DV-II+viscometer at 25° C. and shear rate 3 RPM.

Materials

All materials used in the following examples were readily available from Aldrich Chemical Co. (Belgium) unless otherwise specified. The "water" used in the examples was deionized water. The following materials were used:

DPGDA™ is a difunctional acrylate monomer available from UCB.

Sartomer™ SR351 is a trifunctional acrylate monomer available from BASF

Irgacure™ 500 is a photo-initiator mixture available from CIBA SPECIALTY CHEMICALS.

All hyperbranched polyglycidols $PG_8$, $PG_{15}$, $PG_{17}$, $PG_{33}$ and $PG_{36}$ are available from HYPERPOLYMERS GMBH, Freiburg, Germany Quantacure™ EHA and Quantacure™ ITX available from RAHN AG.

PET is poly(ethylene) terephthalate. Unsubbed PET substrate with on the backside an anti-blocking layer with anti-static properties available from AGFA-GEVAERT as P125C PLAIN/ABAS.

Example 1

This example illustrates the synthesis of a polymeric co-initiator with a hyperbranched polyglycidol core. The polymeric co-initiators CI-1 to CI-5 prepared, are represented by generalized formula CI-A.

Generalized Formula CI-A

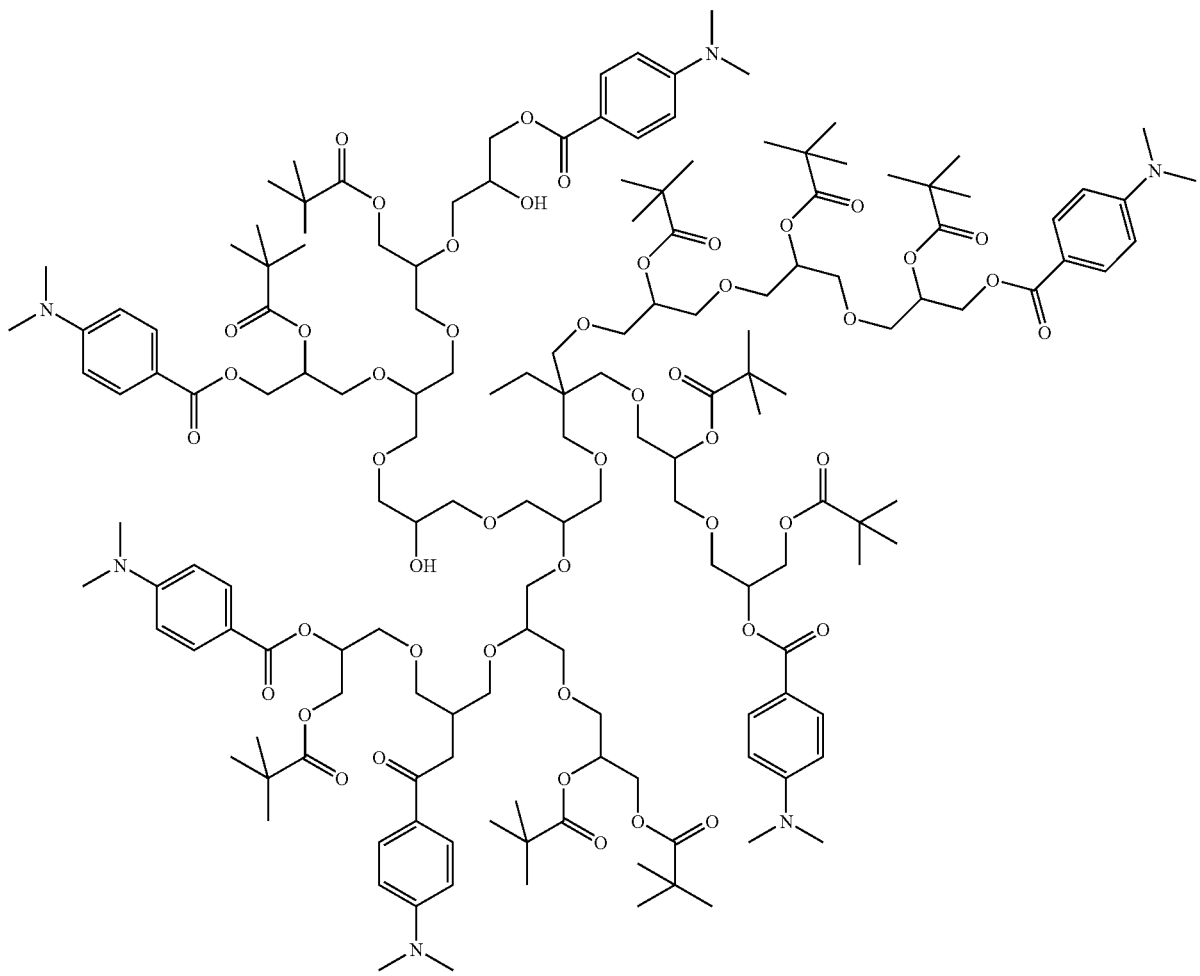

The hyperbranched polyglycidols selected for this example had three different molecular weights:

PG$_8$ : a hyperbranched polyglycidol with 8 hydroxyl groups on average;
PG$_{15}$: a hyperbranched polyglycidol with 15 hydroxyl groups on average; and
PG$_{36}$: a hyperbranched polyglycidol with 36 hydroxyl groups on average.

Synthesis of Polymeric Co-Initiator CI-1 (PG$_{15}$DMBA$_{4.1}$Piv$_{10.9}$)

2 g of the hyperbranched polyglycidol PG$_{15}$ was dissolved in 50 mL pyridine. The solution was flushed with nitrogen. 0.3 equivalents relative to the hydroxyl groups of 4-dimethylamino-benzoylchloride were added and the reaction mixture was heated to 100° C. for 16 hours. The reaction mixture was allowed to cool down to room temperature and 0.9 equivalents relative to the hydroxyl groups of pivaloyl chloride were added. The mixture was heated to 70° C. for 16 hours. After 16 hours, 2 mL of water was added and the solvent was removed under reduced pressure. The oily residue was dissolved in chloroform and the organic phase was extracted twice with a 5% solution of oxalic acid, twice with deionized water, twice with a 10% NaOH solution and three times with deionized water. The organic phase was dried over Na$_2$SO$_4$ and evaporated under reduced pressure. The isolated polymer was dried under vacuum at 40° C. for 16 hours. The structure of the isolated polymer was confirmed by $^1$H-NMR.

The polymeric co-initiator CI-1 was a hyperbranched polyglycidol with 15 hydroxyl end groups on average, where 4.1 hydroxyl groups on average were acylated with 4-dimethylamino-benzoic acid and 10.9 hydroxyl groups on average were acylated with pivalic acid. The polymeric co-initiator CI-1 had a numeric average molecular weight of 2500.

Synthesis of Polymeric Co-Initiator CI-2 (PG$_{36}$DMBA$_9$Piv$_{27}$)

The polymeric co-initiator CI-2 was prepared in the same manner as polymeric co-initiator CI-1 except that PG$_{36}$ was used.

The polymeric co-initiator CI-2 was a hyperbranched polyglycidol with 36 hydroxyl end groups on average, where 9 hydroxyl groups on average were acylated with 4-dimethylamino-benzoic acid and 27 hydroxyl groups on average were acylated with pivalic acid. The polymeric co-initiator CI-2 had a numeric average molecular weight of 6200.

Synthesis of Polymeric Co-Initiator CI-3 (PG$_8$DMBA4.9Piv$_{3.1}$)

The polymeric co-initiator CI-3 was prepared in the same manner as co-initiator CI-1 except that PG$_8$ was used and that 0.5 equivalents 4-dimethylamino-benzoylchloride and 0.7 equivalents pivaloyl chloride relative to the hydroxyl groups of the hyperbranched polyglycidol was used.

The obtained polymeric co-initiator CI-3 was a hyperbranched polyglycidol with 8 hydroxyl end groups on average, where 4.9 hydroxyl groups on average were acylated with 4-dimethylamino-benzoic acid and 3.1 hydroxyl groups on average were acylated with pivalic acid. The polymeric co-initiator CI-3 had a numeric average molecular weight of 1500.

Synthesis of Polymeric Co-Initiator CI-4 ($PG_{15}DMBA_{7.5}Piv_{7.5}$)

The polymeric co-initiator CI-4 was prepared in the same manner as co-initiator CI-1 except that 0.5 equivalents 4-dimethylamino-benzoylchloride and 0.7 equivalents pivaloyl chloride relative to the hydroxyl groups of the hyperbranched polyglycidols was used.

The obtained polymeric co-initiator CI-4 was a hyperbranched polyglycidol with 15 hydroxyl end groups on average, where 7.5 hydroxyl groups on average were acylated with 4-dimethylamino-benzoic acid and 7.5 hydroxyl groups on average were acylated with pivalic acid. The polymeric co-initiator CI-4 had a numeric average molecular weight of 2760.

Synthesis of Polymeric Co-Initiator CI-5 ($PG_{36}DMBA_{16.8}Piv_{19.2}$)

The polymeric co-initiator CI-5 was prepared in the same manner as co-initiator CI-2 except that 0.5 equivalents 4-dimethylamino-benzoylchloride and 0.7 equivalents pivaloyl chloride relative to the hydroxyl groups of the hyperbranched polyglycidols was used.

The polymeric co-initiator CI-5 was a hyperbranched polyglycidol with 36 hydroxyl end groups on average, where 16.8 hydroxyl groups on average were acylated with 4-dimethylamino-benzoic acid and 19.2 hydroxyl groups on average were acylated with pivalic acid. The polymeric co-initiator CI-5 had a numeric average molecular weight of 6700.

Example 2

This example illustrates the effectiveness of the polymeric co-initiators in radiation curable compositions.

The comparative radiation curable composition COMP-1 and the inventive radiation curable compositions INV-1 to INV-10 were prepared according to Table 6. The weight % (wt %) was based on the total weight of the radiation curable composition.

The comparative radiation curable composition COMP-1 and the inventive radiation curable compositions INV-1 to INV-10 were coated on an unsubbed 100 μm PET substrate using a bar coater and a 10 μm wired bar. Each coated layer was cured using a Fusion DRSE-120 conveyer, equipped with a Fusion VPS/I600 lamp (D-bulb), which transported the samples under the UV lamp on a conveyer belt at a speed of 20 m/min. The curing speed was determined for the comparative radiation curable composition COMP-1 and the inventive radiation curable compositions INV-1 to INV-10. The results are summarized in Table 7.

TABLE 7

| Radiation curable composition | Sensitivity % of maximum output |
| --- | --- |
| COMP-1 | 80 |
| INV-1 | 45 |
| INV-2 | 50 |
| INV-3 | 40 |
| INV-4 | 100 |
| INV-5 | 50 |
| INV-6 | 80 |
| INV-7 | 50 |
| INV-8 | 65 |
| INV-9 | 40 |
| INV-10 | 50 |

Table 7 shows that all inventive radiation curable compositions have a comparable to higher curing speed compared to the comparative radiation curable composition COMP-1 with a state of the art commercial co-initiator.

Example 3

This example illustrates that the polymeric co-initiators according to the present invention are not likely to be extracted by food when food packaging materials are printed upon with a radiation curable ink containing such a polymeric co-initiator.

Radiation curable compositions were prepared according to Table 8 using the polymeric co-initiators synthesized in Example 1. The weight % (wt %) was based on the total weight of the radiation curable composition.

TABLE 8

| wt % of | COMP-2 | INV-11 | INV-12 | INV-13 |
| --- | --- | --- | --- | --- |
| DPGDA | 53 | 52 | 50 | 42 |
| Sartomer ™ SR351 | 30 | 30 | 30 | 30 |
| Benzophenone | 10 | 10 | 10 | 10 |
| Quantacure ™ EHA | 7 | — | — | — |
| CI-2 | — | — | 10 | — |

TABLE 6

| wt % of: | COMP1 | INV1 | INV2 | INV3 | INV4 | INV5 | INV6 | INV7 | INV8 | INV9 | INV10 |
| --- | --- | --- | --- | --- | --- | --- | --- | --- | --- | --- | --- |
| DPGDA | 41 | 52 | 52 | 44 | 44 | 50 | 50 | 42 | 42 | 42 | 42 |
| Sartomer ™ SR351 | 41 | 30 | 30 | 30 | 30 | 30 | 30 | 30 | 30 | 30 | 30 |
| Irgacure ™ 500 | 10 | 10 | — | 10 | — | 10 | — | 10 | — | 10 | — |
| Benzophenone | — | — | 10 | — | 10 | — | 10 | — | 10 | — | 10 |
| Quantacure ™ EHA | 8 | — | — | — | — | — | — | — | — | — | — |
| CI-1 | — | — | — | 16 | 16 | — | — | — | — | — | — |
| CI-2 | — | — | — | — | — | — | — | 18 | 18 | — | — |
| CI-3 | — | 8 | 8 | — | — | — | — | — | — | — | — |
| CI-4 | — | — | — | — | — | 10 | 10 | — | — | — | — |
| CI-5 | — | — | — | — | — | — | — | — | — | 18 | 18 |

TABLE 8-continued

| wt % of | COMP-2 | INV-11 | INV-12 | INV-13 |
|---------|--------|--------|--------|--------|
| CI-3    | —      | 8      | —      | —      |
| CI-4    | —      | —      | —      | 18     |

The comparative radiation curable composition COMP-2 and the inventive radiation curable compositions INV-11 to INV-13 were coated on an unsubbed 100 µm PET substrate using a bar coater and a 10 µm wired bar. Each coated layer was cured using a Fusion DRSE-120 conveyer, equipped with a Fusion VPS/I600 lamp (D-bulb), which transported the samples under the UV lamp on a conveyer belt at a speed of 20 m/min. The viscosity and the amount of initiator, that could be extracted from coated and cured samples of the comparative radiation curable composition COMP-2 and the inventive radiation curable compositions INV-11 to INV-13, were determined. The results are summarized in Table 9.

TABLE 9

| Coated & cured sample of composition | Viscosity (mPa · s) | % co-initiator extracted |
|---|---|---|
| COMP-2 | 20 | 47 |
| INV-11 | 25 | 17 |
| INV-12 | 34 | 29 |
| INV-13 | 63 | 29 |

The results in Table 9 clearly demonstrate the reduced extractability of polymeric co-initiators. All the inventive radiation curable compositions INV-11 to INV-13 have a viscosity smaller than 100 mpa.s, which is a requirement for most radiation curable inkjet inks.

Example 4

This example illustrates that hyperbranched polymeric co-initiators can be further derivatized with a compatibilizing group and that they remain effective polymeric co-initiators in radiation curable compositions.

The prepared polymeric co-initiators CI-6 to CI-8 are represented by generalized formula CI-B.

Generalized formula CI-B wherein,

PG represents a hyperbranched polyglycidol core x represents the average number of terminal hydroxyl groups in the starting polyglycidol The polymeric co-initiators CI-6 to CI-8 were prepared according to Table 10, which mentions the ratio of the different groups acylated onto each starting polyglycidol core.

TABLE 10

| Co-initiator | X | DMBA | MEEA | Ac | General formula |
|---|---|---|---|---|---|
| CI-6 | 8 | 3.4 | 3.5 | 1.1 | $PG_8DMBA_{3.4}MEEA_{3.5}Ac_{1.1}$ |
| CI-7 | 17 | 3.4 | 8.8 | 4.8 | $PG_{17}DMBA_{3.4}MEEA_{8.8}Ac_{4.8}$ |
| CI-8 | 33 | 6.6 | 16.5 | 9.9 | $PG_{33}DMBA_{6.6}MEEA_{16.5}Ac_{9.9}$ |

The synthesis is exemplified for the polymeric co-initiator CI-7. 3.45 g (2.84 mmol) of $PG_{17}$, 2.95 mL (19.3 mmol) of MEEA and 0.96 g (4.83 mmol) of p-toluenesulfonic acid monohydrate were added into a 100 mL one-neck flask equipped with a Dean-Stark and a condenser. Then 40 mL of toluene was added and the mixture was heated to 136° C. and stirred for 3 hours, while water was azeotropically removed. Then the solvent was removed under vacuum. At the same time a solution of 4.79 g (29.0 mmol) of 4-dimethylaminobenzoic acid and 4.71 g (29.0 mmol) of 1,1'-carbonyidiimidazole (CDI) in 40 mL of THF was stirred at room temperature for 3 hours. Then this solution was added to the flask containing the MEEA partially modified PG. After the mixture was refluxed overnight, 2.74 mL (29.0 mmol) of acetic anhydride was added to modify the residual hydroxyl groups of PG. The solution was refluxed for 6 hours, before water was added to destroy the residual acetic anhydride. After removing most of the volatile compounds under reduced pressure, the residue was dissolved in chloroform. The mixture was washed twice with 5% of oxalic acid aq, three times with deionized water, twice with 10% of NaOH aq and several times by NaCl aq until pH=7. After removing the solvent, the residual water was removed by azeotropical. distillation with toluene. After filtration, most of the toluene was removed and the residue was kept at 40° C. in a vacuum oven overnight.

The co-initiators CI-6 and CI-8 were prepared in the same manner and analyzed with $^1H$ NMR ($CDCl_3$): d=0.77, 1.32 (TMP core of PG); 2.01 ($CH_3COO$—); 2.99 (($CH_3)_2N$—); 3.07-5.52 (protons of PG and MEEA moieties); 6.58 and 7.82 (proton of aromatic ring).

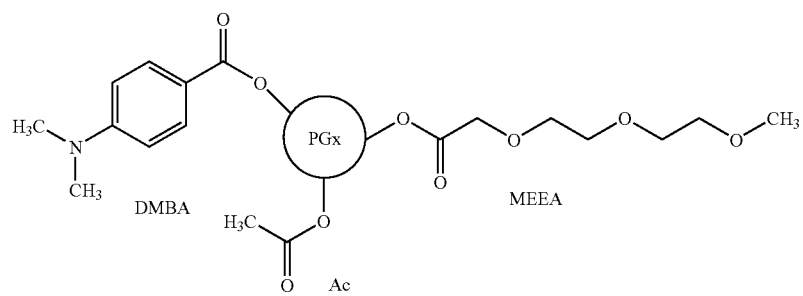

The synthesized polymeric co-initiators displayed properties as disclosed by Table 11.

TABLE 11

| Co-initiator | $M_n$ | Yield |
|---|---|---|
| CI-6 | 1627 | 41% |
| CI-7 | 3326 | 63% |
| CI-8 | 6348 | 47% |

The comparative radiation curable composition COMP-3 and inventive radiation curable compositions INV-14 to INV-16 were prepared according to Table 12. The initiator/co-initiator molar ratio was kept constant. The weight % (wt %) was based on the total weight of the radiation curable composition.

TABLE 12

| wt % | COMP-3 | INV-14 | INV-15 | INV-16 |
|---|---|---|---|---|
| DPGDA | 50.0 | 46.5 | 37.0 | 38.0 |
| Sartomer™ SR351 | 40.0 | 40.0 | 40.0 | 40.0 |
| Quantacure™ ITX | 5.0 | 5.0 | 5.0 | 5.0 |
| Quantacure™ EHA | 5.0 | — | — | — |
| CI-6 | — | 8.5 | — | — |
| CI-7 | — | — | 18.0 | — |
| CI-8 | — | — | — | 17.0 |

The comparative radiation curable composition COMP-3 and the inventive radiation curable compositions INV-14 to INV-16 were coated on an unsubbed 100 μm PET substrate using a bar coater and a 10 μm wired bar. Each coated layer was cured using a Fusion DRSE-120 conveyer, equipped with a Fusion VPS/I600 lamp (D-bulb), which transported the samples under the UV lamp on a conveyer belt at a speed of 20 m/min. The curing speed was determined for the comparative radiation curable composition COMP-3 and the inventive radiation curable compositions INV-14 to INV-16. The results are summarized in Table 13.

TABLE 13

| Radiation curable composition | Sensitivity % of maximum output |
|---|---|
| COMP-3 | 50 |
| INV-14 | 100 |
| INV-15 | 40 |
| INV-16 | 50 |

Table 13 shows that all of the samples prepared with the inventive radiation curable compositions INV-14 to INV-16 have a comparable to higher curing speed compared to the comparative radiation curable composition COMP-3 with a state of the art commercial co-initiator.

Example 5

In this example the effectiveness in a radiation curable composition of a hyperbranched polymeric co-initiator further derivatized with a compatibilizing group is compared with that of a corresponding compound of low molecular weight.

The prepared polymeric co-initiators CI-9 to CI-13 are represented by generalized formula CI-C.

Generalized formula CI-C

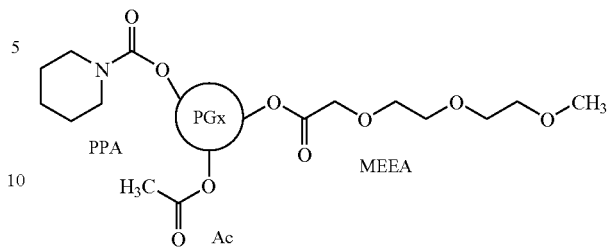

wherein,
PG represents a hyperbranched polyglycidol core
x represents the average number of terminal hydroxyl groups in the starting polyglycidol The polymeric co-initiators CI-9 to CI-13 were prepared according to Table 14, which mentions the ratio of the different groups acylated onto each starting polyglycidol core.

TABLE 14

| Co-initiator | X | PPA | MEEA | Ac | General formula |
|---|---|---|---|---|---|
| CI-9 | 8 | 4.1 | 3.6 | 0.3 | $PG_8PPA_{4.1}MEEA_{3.6}Ac_{0.3}$ |
| CI-10 | 17 | 5.3 | 11.2 | 0.5 | $PG_{17}PPA_{5.3}MEEA_{11.2}Ac_{0.5}$ |
| CI-11 | 17 | 7.1 | 8.2 | 1.7 | $PG_{17}PPA_{7.1}MEEA_{8.2}Ac_{1.7}$ |
| CI-12 | 33 | 10.0 | 22.4 | 0.6 | $PG_{33}PPA_{10}MEEA_{22.4}Ac_{0.6}$ |
| CI-13 | 33 | 13.9 | 15.8 | 3.3 | $PG_{33}PPA_{13.9}MEEA_{15.8}Ac_{3.3}$ |

The synthesis is exemplified for the polymeric co-initiator CI-10. 3.66 g (3.0 mmol) of $PG_{17}$ ($M_n$=1214 g/mol$^{-1}$, $M_w/M_n$=1.6), 2.41 g (15.3 mmol) of 1-piperidinepropionic acid (PPA), 2.34 mL (15.3 mmol) of 2-[2-(2-methoxyethoxy)ethoxy]acetic acid (MEEA) and 3.90g (20.4mmol) of p-toluenesulfonic acid monohydrate were added into a 100 mL one-neck flask equipped with a Dean-Stark and a condenser. 40 mL of toluene was added and the mixture was heated to 136° C. and stirred for 3 hours, while water was azeotropically removed. Then 4.68 mL (30.6 mmol) of MEEA was added and the mixture was heated to 136° C. and stirred for an additional 6 hours. Subsequently 1.76 mL (30.6 mmol) of acetic acid was added, the mixture was stirred overnight under the same reaction condition. After removing most of the solvent under reduced pressure, the residue was dissolved in chloroform. The mixture was washed twice with 10% of NaOH aq and several times with NaCl aq until pH=7. After removing the solvent, residual water was removed by azeotropical distillation with toluene. After filtration, most of the toluene was removed and the residue was kept at 40° C. in a vacuum oven overnight.

The co-initiators CI-9 and CI-11 to CI-13 were prepared in the same manner and analyzed with $^1$H NMR (CDCl$_3$): δ=0.77, 1.32 (TMP core of PG); 1.14-1.64(β and γ $CH_2$ in piperidine ring); 1.98 ($CH_3COO$—); 2.13-2.66 (α $CH_2$ in piperidine ring, —$NCH_2CH_2COO$—); 3.0-5.27 (protons of PG and MEEA moieties).

The synthesized polymeric co-initiators displayed properties as disclosed by Table 15.

TABLE 15

| Co-initiator | $M_n$ | Yield |
|---|---|---|
| CI-9 | 1680 | 65% |
| CI-10 | 3766 | 72% |

TABLE 15-continued

| Co-initiator | $M_n$ | Yield |
|---|---|---|
| CI-11 | 3587 | 69% |
| CI-12 | 7321 | 78% |
| CI-13 | 6922 | 71% |

A corresponding compound LI-1 of low molecular weight was synthesized according to the reaction:

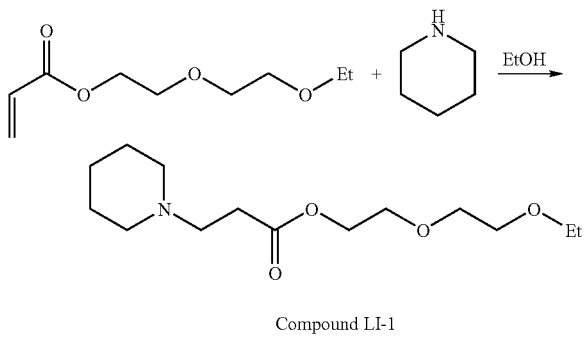

Compound LI-1

11 g of 2-(2-ethoxyethoxy)ethylacrylate was added dropwise to a solution of 5 g piperidine in 30 ml ethanol. Upon addition of the acrylate, the temperature rose to 50° C. The reaction was allowed to continue for 1 hour at room temperature. Based on TLC-analysis, the conversion was as good as quantitative (eluent $CH_2Cl_2$/MeOH: 95/5). The solvent was removed under reduced pressure and the compound was dried under vacuum. The compound LI-1 was sufficiently pure for direct use.

The comparative radiation curable composition COMP-4 and inventive radiation curable compositions INV-17 to INV-21 were prepared according to Table 16. The initiator/co-initiator molar ratio was kept constant. The weight % (wt %) was based on the total weight of the radiation curable composition.

TABLE 16

| wt % | COMP-4 | INV-17 | INV-18 | INV-19 | INV-20 | INV-21 |
|---|---|---|---|---|---|---|
| DPGDA | 50.0 | 47.5 | 42.0 | 46.0 | 41.5 | 46.0 |
| Sartomer ™ SR351 | 40.0 | 40.0 | 40.0 | 40.0 | 40.0 | 40.0 |
| Quantacure ™ ITX | 5.0 | 5.0 | 5.0 | 5.0 | 5.0 | 5.0 |
| Compound LI-1 | 5.0 | — | — | — | — | — |
| CI-9 | — | 7.5 | — | — | — | — |
| CI-10 | — | — | 13.0 | — | — | — |
| CI-11 | — | — | — | 9.0 | — | — |
| CI-12 | — | — | — | — | 13.5 | — |
| CI-13 | — | — | — | — | — | 9.0 |

The comparative radiation curable composition COMP-4 and inventive radiation curable compositions INV-17 to INV-21 were coated on an unsubbed 100 μm PET substrate using a bar coater and a 10 μm wired bar. Each coated layer was cured using a Fusion DRSE-1 20 conveyer, equipped with a Fusion VPS/I600 lamp (D-bulb), which transported the samples under the UV lamp on a conveyer belt at a speed of 20 m/min. The curing speed was determined for the comparative radiation curable composition COMP-4 and inventive radiation curable compositions INV-17 to INV-21. The results are summarized in Table 17.

TABLE 17

| Coated & cured sample of composition | Sensitivity % of maximum output |
|---|---|
| COMP-4 | 45 |
| INV-17 | 60 |
| INV-18 | 45 |
| INV-19 | 40 |
| INV-20 | 40 |
| INV-21 | 40 |

Table 17 shows that all of the inventive samples prepared with the radiation curable compositions INV-17 to INV-21 have a comparable to higher curing speed compared to the sample prepared from the comparative radiation curable composition COMP-4 with a corresponding co-initiator LI-1 of low molecular weight.

Having described in detail preferred embodiments of the current invention, it will now be apparent to those skilled in the art that numerous modifications can be made therein without departing from the scope of the invention as defined in the following claims.

The invention claimed is:

1. A radiation curable composition comprising a polymeric co-initiator comprising a hyperbranched polymer core with at least one co-initiating functional group as an end group, wherein the hyperbranched polymer core is a hyperbranched polyglycidol or a hyperbranched copolymer of glycidol and other epoxides and the at least one co-initiating functional group is a tertiary amine.

2. The radiation curable composition according to claim 1, wherein the tertiary amine is a 4-dialkylamino-benzoic acid or a 4-dialkylamino-benzoic acid derivative.

3. The radiation curable composition according to claim 1, wherein said polymeric co-initiator has at least five co-initiating functional groups as end groups on the hyperbranched polymer core.

4. The radiation curable composition according to claim 1, wherein said hyperbranched polymer core has at least one other functional group as an end group.

5. The radiation curable composition according to claim 4, wherein said one other functional group is a compatibilizing group to improve the compatibility of the polymeric co-initiator with a radiation curable composition.

6. The radiation curable composition according to claim 1, wherein said hyperbranched polymer core has a polydispersity $M_w/M_n$ smaller than 3.

7. The radiation curable composition according to claim 4, wherein said hyperbranched polymer core has a polydispersity Mw/Mn smaller than 3.

8. The radiation curable composition according to claim 1, wherein said at least one co-initiator or co-initiator derivative is selected from the group consisting of:

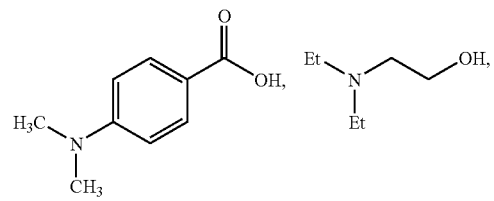

-continued
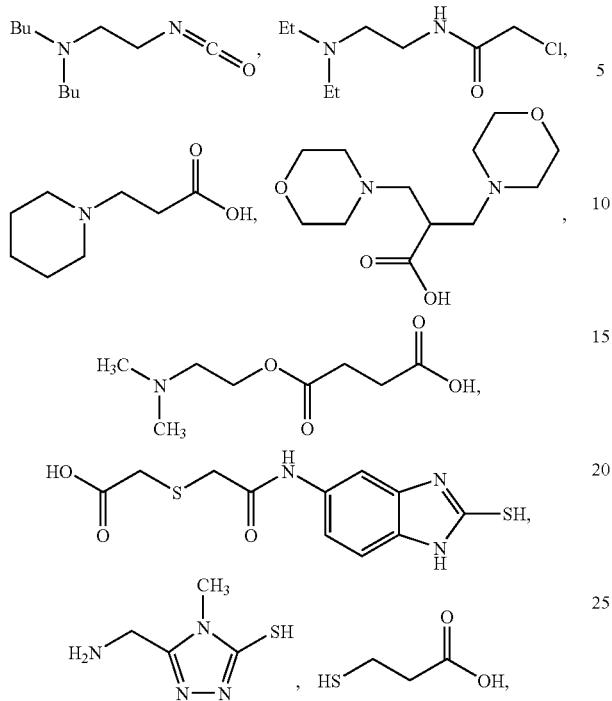
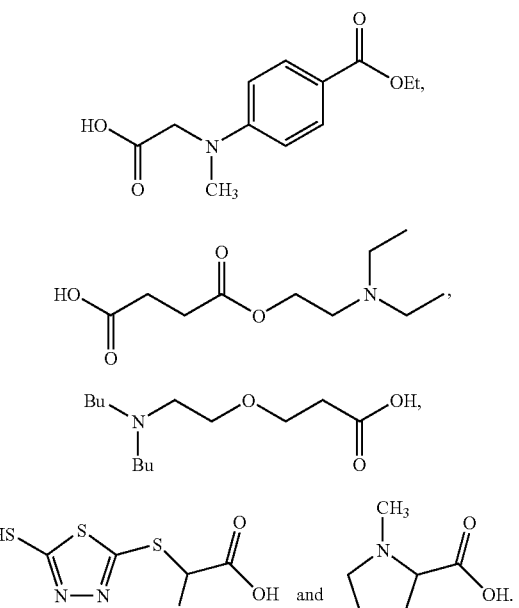
* * * * *

UNITED STATES PATENT AND TRADEMARK OFFICE
CERTIFICATE OF CORRECTION

PATENT NO. : 7,507,785 B2  Page 1 of 1
APPLICATION NO. : 11/169091
DATED : March 24, 2009
INVENTOR(S) : Vanmaele et al.

It is certified that error appears in the above-identified patent and that said Letters Patent is hereby corrected as shown below:

ON THE TITLE PAGE ITEM 75

In the Inventors section, the name of the second inventor should be corrected from "Loccufoer" to --Loccufier--.

Signed and Sealed this

Nineteenth Day of May, 2009

JOHN DOLL
*Acting Director of the United States Patent and Trademark Office*